US010519569B2

(12) United States Patent
Parker et al.

(10) Patent No.: US 10,519,569 B2
(45) Date of Patent: Dec. 31, 2019

(54) IMMERSED ROTARY JET SPINNING DEVICES (IRJS) AND USES THEREOF

(71) Applicant: President and Fellows of Harvard College, Cambridge, MA (US)

(72) Inventors: Kevin Kit Parker, Cambridge, MA (US); Grant Michael Gonzalez, Thousand Oaks, CA (US); Holly M. Golecki, Acton, MA (US); Kwanwoo Shin, Lexington, MA (US); Josue Adrian Goss, Somerville, MA (US)

(73) Assignee: President and Fellows of Harvard College, Cambridge, MA (US)

(*) Notice: Subject to any disclaimer, the term of this patent is extended or adjusted under 35 U.S.C. 154(b) by 866 days.

(21) Appl. No.: 14/763,620

(22) PCT Filed: Feb. 13, 2014

(86) PCT No.: PCT/US2014/016197
§ 371 (c)(1),
(2) Date: Jul. 27, 2015

(87) PCT Pub. No.: WO2014/127099
PCT Pub. Date: Aug. 21, 2014

(65) Prior Publication Data
US 2015/0354094 A1   Dec. 10, 2015

Related U.S. Application Data

(60) Provisional application No. 61/764,349, filed on Feb. 13, 2013, provisional application No. 61/837,779, filed on Jun. 21, 2013.

(51) Int. Cl.
*D01D 5/06* (2006.01)
*D01D 5/18* (2006.01)
(Continued)

(52) U.S. Cl.
CPC .......... *D01D 5/18* (2013.01); *C08J 5/18* (2013.01); *D01D 5/06* (2013.01); *D01F 6/605* (2013.01);
(Continued)

(58) Field of Classification Search
CPC .................................. D01D 5/06; D01D 5/18
See application file for complete search history.

(56) References Cited

U.S. PATENT DOCUMENTS

| 1,975,504 A | 10/1934 | Formhals |
| 2,067,410 A | 1/1937 | Newnham |

(Continued)

FOREIGN PATENT DOCUMENTS

| CN | 1710160 A | 12/2005 |
| CN | 101538745 A | 9/2009 |

(Continued)

OTHER PUBLICATIONS

Harfenist , S., et al., Direct Drawing of Suspended Filamentary Micro- and Nanostructures from Liquid Polymers. Nano Letters, 2004;4(10):1931-1937.

(Continued)

*Primary Examiner* — Joseph S Del Sole
*Assistant Examiner* — Joseph S Leyson
(74) *Attorney, Agent, or Firm* — McCarter & English, LLP; Maria Laccotripe Zacharakis; Anita M. Bowles

(57) ABSTRACT

Exemplary embodiments provide systems, devices and methods for the fabrication of three-dimensional polymeric fibers having micron, submicron and nanometer dimensions, as well as methods of use of the polymeric fibers.

13 Claims, 11 Drawing Sheets

(51) Int. Cl.
*C08J 5/18* (2006.01)
*D01F 6/60* (2006.01)
*D01F 9/00* (2006.01)

(52) U.S. Cl.
CPC ............ *D01F 9/00* (2013.01); *C08J 2377/10* (2013.01); *D10B 2331/021* (2013.01); *Y10T 428/249921* (2015.04)

(56) References Cited

U.S. PATENT DOCUMENTS

| | | | |
|---|---|---|---|
| 2,138,394 A * | 11/1938 | Wuppermann | D01D 5/18 425/67 |
| 2,336,743 A | 12/1943 | Manning | |
| 3,038,779 A * | 6/1962 | Hechler | D01D 4/02 264/151 |
| 4,237,081 A | 12/1980 | Murphy et al. | |
| 4,345,355 A | 8/1982 | Berchoux et al. | |
| 4,536,361 A | 8/1985 | Torobin | |
| 5,066,430 A | 11/1991 | Matthews | |
| 5,246,776 A | 9/1993 | Meraldi et al. | |
| 5,441,754 A | 8/1995 | Evans, Sr. | |
| 5,494,616 A | 2/1996 | Voelker et al. | |
| 6,207,274 B1 | 3/2001 | Ferenc et al. | |
| 6,382,526 B1 | 5/2002 | Reneker et al. | |
| 6,596,048 B1 | 7/2003 | Tuffal et al. | |
| 9,410,267 B2 | 8/2016 | Parker et al. | |
| 9,738,046 B2 | 8/2017 | Parker et al. | |
| 2002/0182241 A1 | 12/2002 | Borenstein et al. | |
| 2003/0147983 A1 | 8/2003 | Berrigan et al. | |
| 2004/0037813 A1 | 2/2004 | Simpson et al. | |
| 2004/0234571 A1 | 11/2004 | Jang | |
| 2005/0136253 A1 | 6/2005 | Michael et al. | |
| 2005/0163932 A1 | 7/2005 | Zschieschang et al. | |
| 2006/0060999 A1 | 3/2006 | Amagasa et al. | |
| 2006/0094096 A1 | 5/2006 | Wang et al. | |
| 2006/0105275 A1 | 5/2006 | Maloney et al. | |
| 2007/0207186 A1 | 9/2007 | Scanlon et al. | |
| 2008/0023888 A1 | 1/2008 | Brang et al. | |
| 2008/0136054 A1 | 6/2008 | Fabbricante et al. | |
| 2008/0211121 A1 | 9/2008 | Lai et al. | |
| 2008/0237934 A1 | 10/2008 | Reneker et al. | |
| 2008/0242171 A1 | 10/2008 | Huang et al. | |
| 2008/0299160 A1 | 12/2008 | Agboh et al. | |
| 2008/0307766 A1 | 12/2008 | Petras et al. | |
| 2009/0232874 A1 | 9/2009 | Chu et al. | |
| 2009/0232920 A1 | 9/2009 | Lozano et al. | |
| 2009/0269429 A1 | 10/2009 | Lozano et al. | |
| 2009/0280207 A1 | 11/2009 | Lozano et al. | |
| 2009/0280325 A1 | 11/2009 | Lozano et al. | |
| 2010/0028999 A1 | 2/2010 | Nain | |
| 2010/0037576 A1 | 2/2010 | Claasen et al. | |
| 2010/0233928 A1 | 9/2010 | Ferry et al. | |
| 2011/0073243 A1 | 3/2011 | Yu et al. | |
| 2011/0263729 A1 | 10/2011 | Hermanutz et al. | |
| 2012/0135448 A1 | 5/2012 | Parker et al. | |
| 2013/0312638 A1 | 11/2013 | Parker et al. | |

FOREIGN PATENT DOCUMENTS

| | | |
|---|---|---|
| CN | 101871133 A | 10/2010 |
| WO | WO-03/099230 A2 | 12/2003 |
| WO | WO-04/032713 A2 | 4/2004 |
| WO | WO-2004/080681 A1 | 9/2004 |
| WO | WO-05/017226 A1 | 2/2005 |
| WO | WO-2010/132636 A1 | 11/2010 |
| WO | WO-2012/068402 A2 | 5/2012 |

OTHER PUBLICATIONS

Li, D. and Xia, Y. Electrospinning of nanofibers: Reinventing the wheel? Advanced Materials 2004;16(14):1151-1170.
Feinberg, A.W., et al. Muscular Thin Films for Building Actuators and Powering Devices. Science 2007; 317(5843):1366-1370.
Arumuganathar, S. and Jayasinghe, S.N. Living Scaffolds (Specialized and Unspecialized) for Regenerative and Therapeutic Medicine. Biomacromolecules 2008; 9(3):759-766.
Weitz R.T., et al. Polymer Nanofibers via Nozzle-Free Centrifugal Spinning. Nano Letters 2008;8(4):1187-1191.
Xie, J., et al. Putting Electrospun Nanofibers to Work for Biomedical Research. Macromolecular Rapid Communications 2008;29(22): 1775-1792.
Madurantakam, P.A., et al. Science of nanofibrous scaffold fabrication: strategies for next generation tissue-engineering scaffolds. Nanomedicine 2009;4(2):193-206.
Madurantakam, P.A., et al. Multiple factor interactions in biomimetic mineralization of electrospun scaffolds. Biomaterials 2009; 30(29):5456-5464.
Nisbet D.R., et al. Review paper: a review of the cellular response on electrospun nanofibers for tissue engineering. J Biomater Appl. Jul. 2009;24(1):7-29.
Pabba, S., et al. Biopolymerization-driven self-assembly of nanofiber air-bridges. Soft Matter 2009;5(7):1378-1385.
Alford P.W., et al. Biohybrid thin films for measuring contractility in engineered cardiovascular muscle. Biomaterials. 2010;31(13):3613-3621.
Badrossamay, M.R. et al. Nanofiber assembly by rotary jet-spinning. Nano Letters 2010;10(6):2257-2261.
International Search Report and Written Opinion in PCT/US11/61241, dated Apr. 11, 2012.
European Search Report in 12867106.2, dated Sep. 25, 20115.
International Search Report and Written Opinion in PCT/US2012/065646, dated Aug. 27, 2013.
International Search Report and Written Opinion in PCT/US14/16197, dated Jul. 30, 2014.
International Search Report and Written Opinion in PCT/US10/34662, dated Jul. 9, 2010.

* cited by examiner

E.

F.

IMMERSED ROTARY JET SPINNING DEVICES (IRJS) AND USES THEREOF

RELATED APPLICATIONS

This application is a 35 U.S.C. § 371 national stage filing of International Application No. PCT/US2014/016197, filed on Feb. 13, 2014, which in turn claims priority to U.S. Provisional Application No. 61/764,349, filed on Feb. 13, 2013, and U.S. Provisional Application No. 61/837,779, filed on Jun. 21, 2013. The entire contents of each of the foregoing applications are incorporated herein by reference.

GOVERNMENT SUPPORT

The invention was supported, in whole or in part, by grant number DMR-0213805 awarded by the National Science Foundation. The United States Government has certain rights in the invention.

BACKGROUND

Electrospinning is a common conventional process for fabricating polymeric fibers. Electrospinning uses high voltages to create an electric field between a droplet of polymer solution at the tip of a needle and a collection device. One electrode of the voltage source is placed in the solution and the other electrode is connected to the collection device. This exerts an electrostatic force on the droplet of polymer solution. As the voltage is increased, the electric field intensifies, thus increasing the magnitude of the force on the pendant droplet of polymer solution at the tip of the needle. The increasing electrostatic force acts in a direction opposing the surface tension of the droplet and causes the droplet to elongate, forming a conical shape known as a Taylor cone. When the electrostatic force overcomes the surface tension of the droplet, a charged continuous jet of polymer solution is ejected from the cone. The jet of polymer solution accelerates towards the collection device, whipping and bending wildly. As the solution moves away from the needle and toward the collection device, the jet rapidly thins and dries as the solvent evaporates. On the surface of the grounded collection device, a non-woven mat of randomly oriented solid polymeric fibers is deposited. Zufan (2005) *Final RET Report*; Xie, J. W. et al. (2008) *Macromolecular Rapid Communications* 29(22):1775-1792; Reneker, D. H., et al. (2007) *Advances in Applied Mechanics* 41:43-195; Dzenis, Y. (2004) *Science* 304(5679):1917-1919; Rutledge, G. C. and Yu, J. H. (2007) "Electrospinning" In *Encyclopedia of Polymer Science and Technology*, John Wiley & Sons: New Jersey; Krogman, K. C., et al. (2009) *Nature Materials* 8(6):512-518; Pham, Q. P., et al. (2006) *Tissue Engineering* 12(5):1197-1211; Boland, E. D., et al. (2001) *Journal of Macromolecular Science—Pure and Applied Chemistry* 38(12):1231-1243; Teo, W. E. and Ramakrishna, S. (2006) *Nanotechnology* 17(14):R89-R106; Li, D.; Xia, Y. N. (2004) *Advanced Materials* 16(14):1151-1170; Greiner, A. and Wendorff, J. H. (2007) *Angewandte Chemie—International Edition* 46(30):5670-5703.

There are multiple drawbacks associated with electrospinning, e.g., a low production rate, the requirement of a high voltage electrical field, the requirement of precise solution conductivity, and the need for additional devices for producing aligned fiber structures. Lia and Xia (2004) *Advanced Materials* 16:1151-1170; Weitz, et al. (2008) *Nano Letters* 8:1187-1191; Arumuganathar, S. and Jayasinghe, S. N. (2008) *Biomacromolecules* 9(3):759-766.

Devices and methods to overcome the drawbacks associated with electrospinning have been described in, for example, U.S. Patent Publication No U.S. 2012/0135448 and PCT Publication No. WO 2012/068402. These devices are referred to as Rotary Jet Spinning Devices (RJS) and allow the *facile* fabrication of polymeric fibers having micron, submicron, and nanometer dimensions. RJS devices permit the formation of polymeric fibers by essentially ejecting a polymer solution through an orifice of a reservoir into air. Air drag extends and elongates the jets into fibers as the solvent in the material solution rapidly evaporates. Nonetheless, in the case of slow evaporating solvents, e.g., aqueous solvents, and in the case of reservoirs that spin at low rotational speeds, the air drag experienced by the material jets may not be sufficient to evaporate certain solvents before they reach the collection device. In addition, air drag alone is insufficient to prepare polymeric fibers in the case of polymers that require on-contact crosslinking, precipitation, and/or a combination of elongation in air and on-contact crosslinking or precipitation. Therefore, fabrication of polymeric fibers using water soluble polymers and/or polymer solutions which, e.g., require on-contact crosslinking and/or precipitation, to form physically and chemically stable polymeric fibers remains challenging.

Accordingly, there is a need in the art for improved systems, devices and methods for the fabrication of polymeric fibers, such as nanofibers.

SUMMARY

The present invention provides systems, devices and methods for the fabrication of three-dimensional polymeric fibers having micron, submicron or nanometer dimensions, as well as the polymeric fibers that are produced and methods of use of the polymeric fibers.

In accordance with one exemplary embodiment, a device is provided for formation of one or more micron, submicron or nanometer dimension polymeric fibers. The device includes a reservoir holding a polymer solution. The reservoir includes a surface having one or more orifices for ejecting the polymer solution from the reservoir for fiber formation. The device also includes a motion generator configured to impart rotational motion to the reservoir so that the rotational motion causes ejection of the polymer solution from the reservoir through the one or more orifices. The device also includes a collection device holding a liquid and configured and positioned to accept the polymer solution ejected from the reservoir. The reservoir and the collection device are positioned such that the one or more orifices of the reservoir are submerged in the liquid in the collection device. The ejection of the polymer solution into the liquid in the collection device causes formation of one or more micron, submicron or nanometer dimension polymeric fibers.

In accordance with another exemplary embodiment, a device is provided for formation of one or more micron, submicron or nanometer dimension polymeric fibers. The device includes a reservoir for holding a polymer and including an outer surface having one or more orifices for ejecting the polymer for fiber formation. The device may further include a first motion generator couplable to the reservoir, the first motion generator configured to impart rotational motion to the reservoir to cause ejection of the polymer through the one or more orifices. The device may further include a collection device holding a liquid, the collection device configured and positioned to accept the polymer ejected from the reservoir, a second motion generator couplable to the collection device, the second motion generator configured to impart rotational motion to the liquid in the collection device to generate a liquid vortex including an air gap, wherein the reservoir and the collection device are positioned such that the one or more orifices of the reservoir are positioned in the air gap of the liquid vortex in the collection device; and wherein the ejection of the polymer into the air gap and subsequently into the liquid of the liquid vortex in the collection device causes formation of one or more micron, submicron or nanometer dimension polymeric fibers.

The air gap may be positioned centrally in the liquid vortex in the collection device.

The first and second motion generators may impart rotational motion in the same or opposite rotational direction.

In one embodiment, the one or more orifices of the reservoir are not in contact with the liquid in the collection device.

In one embodiment, the air gap is formed along a central axis of the liquid vortex and abutting the top surface of the liquid in the liquid vortex, and wherein the one or more orifices of the reservoir are positioned below the highest level of the top surface of the liquid in the collection device.

In one embodiment, the first motion generator is a motor.

In one embodiment, the second motion generator is a stir bar.

In one embodiment, the stir bar has a length of about 2 inches to about 4 inches.

In one embodiment, rotational motion of the liquid in the collection device is about 200 to about 1,500 rpm.

In one embodiment, the volume of the liquid in the collection device is about 2 liters.

In one embodiment, the second motion generator is a drainage system that imparts the rotational motion to the liquid by draining the liquid through the draining system.

The one or more orifices may be horizontally spaced from the liquid in the liquid vortex by a distance of about 0.01 cm to about 8.0 cm. In one embodiment, the one or more orifices are horizontally spaced from the liquid in the liquid vortex by a distance of about 3.0 cm to about 6.0 cm.

In one embodiment, the ejection of the polymer into the air gap and subsequently into the liquid of the liquid vortex causes precipitation of the one or more micron, submicron or nanometer dimension polymeric fibers. In another embodiment, the ejection of the polymer into the air gap and subsequently into the liquid of the liquid vortex causes cross-linking of the one or more micron, submicron or nanometer dimension polymeric fibers.

In one embodiment, the liquid comprises one or more cells, and ejection of the polymer into the air gap and subsequently into the liquid of the liquid vortex causes formation of the one or more micron, submicron or nanometer dimension polymeric fibers having the one or more cells enmeshed therein.

In one embodiment, the exemplary fiber formation device further comprises a first control mechanism configured to control a speed of the rotational motion imparted by the first motion generator, and a second control mechanism configured to control a speed of the rotational motion imparted by the second motion generator. In one embodiment, the first motion generator is also configured to impart a linear oscillatory motion to the reservoir.

The liquid in the collection device may be rotated at about 200 rpm or above, e.g., about 200 rpm to about 1,500 rpm.

In accordance with another exemplary embodiment, a method is provided for fabricating one or more micron, submicron or nanometer dimension polymeric fibers using an exemplary fiber formation device. The method may include providing the device, using the motion generator to rotate the reservoir about an axis of rotation to cause ejection of the polymer solution in one or more jets, and collecting the one or more jets of the polymer in the liquid held in the collection device to cause formation of the one or more micron, submicron or nanometer dimension polymeric fibers.

In accordance with another exemplary embodiment, a method is provided for fabricating one or more micron, submicron or nanometer dimension polymeric fibers. The method includes providing a polymer in solution, rotating the polymer in solution about an axis of rotation to cause ejection of the polymer solution in one or more jets, and collecting the one or more jets of the polymer in a liquid to cause formation of one or more micron, submicron or nanometer dimension polymeric fibers.

The present invention also provides methods for fabricating one or more micron, submicron or nanometer dimension polymeric fibers. The methods include providing a polymer in solution, rotating the polymer in solution about an axis of rotation to cause ejection of the polymer solution in one or more jets, generating a liquid vortex in a collection device for collecting the one or more jets of the polymer, the liquid vortex including a central air gap, and collecting the one or more jets of the polymer in the collection device, wherein the one or more jets are initially ejected through the air gap of the liquid vortex and subsequently through the liquid in the liquid vortex of the collection device, wherein the ejection of the polymer into the air gap and subsequently into the liquid in the collection device causes formation of one or more micron, submicron or nanometer dimension polymeric fibers.

In another aspect, the present invention provides methods or fabricating one or more micron, submicron or nanometer dimension polymeric fibers. The methods include providing a device of the invention, using the first motion generator to rotate the reservoir about an axis of rotation to cause ejection of the polymer in one or more jets, using the second motion generator to rotate the liquid in the collection device to generate the liquid vortex, and collecting the one or more jets of the polymer in the air gap of the liquid vortex and subsequently in the liquid of the liquid vortex of the collection device to cause formation of the one or more micron, submicron or nanometer dimension polymeric fibers.

Rotational speeds of the reservoir in exemplary embodiments may range from about 1,000 rpm to about 400,000 rpm, e.g., about 1,000, 3,000, 5,000, 10,000, 50,000, 55,000, 60,000, 65,000, 70,000, 75,000, 80,000, 85,000, 90,000, 95,000, 100,000, 105,000, 110,000, 115,000, 120,000, 125,000, 130,000, 135,000, 140,000, 145,000, 150,000 rpm, about 200,000 rpm, 250,000 rpm, 300,000 rpm, 350,000 rpm, or about 400,000 rpm. Ranges and values intermediate to the above recited ranges and values are also contemplated to be part of the invention.

Exemplary orifice lengths that may be used in some exemplary embodiments range between about 0.001 m and about 0.1 m, e.g., about 0.0015, 0.002, 0.0025, 0.003, 0.0035, 0.004, 0.0045, 0.005, 0.0055, 0.006, 0.0065, 0.007, 0.0075, 0.008, 0.0085, 0.009, 0.0095, 0.01, 0.015, 0.02, 0.025, 0.03, 0.035, 0.04, 0.045, 0.05, 0.055, 0.06, 0.065, 0.07, 0.075, 0.08, 0.085, 0.09, 0.095, or about 0.1 m. Ranges and values intermediate to the above recited ranges and values are also contemplated to be part of the invention.

Exemplary orifice diameters that may be used in some exemplary embodiments range between about 0.05 μm and about 1000 μm, e.g., about 0.05, 0.06, 0.07, 0.08, 0.09, 0.1, 0.15, 0.2, 0.225, 0.25, 0.275, 0.3, 0.325, 0.35, 0.375, 0.4, 0.425, 0.45, 0.475, 0.5, 0.525, 0.55, 0.575, 0.6, 0.625, 0.65, 0.675, 0.7, 0.725, 0.75, 0.075, 0.8, 0.825, 0.85, 0.825, 0.9, 0.925, 0.95, 0.975, 1.0, 1.5, 2, 2.5, 3, 3.5, 4, 4.5, 5, 5.5, 6, 6.5, 7, 7.5, 8, 8.5, 9, 9.5, 10, 20, 30, 40, 50, 60, 70, 80, 90, 100, 150, 200, 250, 300, 350, 400, 450, 500, 550, 600, 650, 700, 750, 800, 850, 900, 950, or about 1000 µm. Ranges and values intermediate to the above recited ranges and values are also contemplated to be part of the invention.

The reservoir may further comprise a first nozzle provided on a first of the one or more orifices of the reservoir. In one embodiment, the first nozzle has a cross-sectional configuration different from a cross-sectional configuration of the first orifice. In one embodiment, the first nozzle increases the surface area of the formed fiber. In another embodiment, the first nozzle convolutes the surface topography of the formed fiber. In one embodiment, the first nozzle creates one or more structural features on the surface of the formed fiber. In one embodiment, the structural features range in size from about 1 nanometer to about 500 nanometers, e.g., about 1, 2, 3, 4, 5, 6, 7, 8, 9, 10, 15, 20, 25, 30, 35, 40, 45, 50, 55, 60, 65, 70, 75, 80, 90, 100, 125, 150, 175, 200, 250, 300, 350, 400, 450, or 500 nanometers.

In one embodiment, the formed micron, submicron or nanometer dimension polymeric fiber is imaged, e.g., using a scanning electron microscope.

Suitable polymers for use in exemplary devices and methods include water soluble polymers (i.e., polymers dissolved in slowly evaporating solvents, e.g., aqueous solvents), polymers that require on-contact cross-linking (e.g., alginate) and/or polymers that cannot be readily dissolved at a high enough concentrations to provide sufficient viscosity for random entanglement and solvent evaporation to form polymeric fibers (e.g., deoxyribonucleic acid, polyurethane-polyurea copolymer, and polyacrylonitrile), and/or polymers that require precipitation (e.g., deoxyribonucleic acid), and/or polymers dissolved in water at low concentrations (e.g., below 2%) and/or polymers that require both extension in air and precipitation (e.g., polyamides, e.g., liquid crystalline polymers, e.g., poly-paraphenylene terephthalamide and poly(p-phenylene benzobisoxazole)).

Suitable polymers may be biocompatible or non-biocompatible, synthetic or natural, e.g., biogenic polymers, e.g., proteins, polysaccharides, lipids, nucleic acids or combinations thereof.

Exemplary polymers which require on-contact crosslinking include, for example, alginate, gelatin, collagen, chitosan, polyvinyl alcohols, polyacrylamides, starches, and polyethylene oxides, copolymers and derivatives thereof Exemplary polymers which require precipitation include, for example, deoxyribonucleic acid, ribonucleic acid.

Exemplary polymers which require extension in air and precipitation include, for example, polyamides, e.g., liquid crystalline polymers, e.g., poly-paraphenylene terephthalamide, e.g., 1,4-phenylene-diamine (para-phenylenediamine) and terephthaloyl chloride, and poly(p-phenylene benzobisoxazole)).

Suitable polymers for use in the devices and methods provided herein do not include those polymers that are soluble in highly volatile solvents (i.e., liquids with low boiling points and high vapor pressure), such as chloroform, about 90, 95, or about 100% ethanol, DMF (e.g., about 60, 65, 70, 75, 80, 85, 90, 95, or about 100% DMF), acetone, dichloromethane, and diethylether.

In one embodiment the polymers for use in the devices and methods of the invention may be mixtures of two or more polymers and/or two or more copolymers. In one embodiment the polymers for use in the devices and methods of the invention may be a mixture of one or more polymers and or more copolymers. In another embodiment, the polymers for use in the devices and methods of the invention may be a mixture of one or more synthetic polymers and one or more naturally occurring polymers.

In one embodiment, the polymer is fed into the reservoir as a polymer solution, i.e., a polymer dissolved in an appropriate solution. In this embodiment, the methods may further comprise dissolving the polymer in a solvent prior to feeding the polymer into the reservoir.

Alternatively, the polymer may be fed into the reservoir as a polymer melt and, thus, in one embodiment, the reservoir is heated at a temperature suitable for melting the polymer, e.g., heated at a temperature of about 100° C.-300° C., 100° C.-200° C., about 150-300° C., about 150-250° C., or about 150-200° C., 200° C.-250° C., 225° C.-275° C., 220° C.-250° C., or about 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, or about 300° C. Ranges and temperatures intermediate to the recited temperature ranges are also part of the invention. In such embodiments, the reservoir may further comprise a heating element.

In one embodiment of the invention, a plurality of micron, submicron or nanometer dimension polymeric fibers are formed. The plurality of micron, submicron or nanometer dimension polymeric fibers may be of the same diameter or of different diameters.

In one embodiment, the methods of the invention result in the fabrication of micron, submicron or nanometer dimension polymeric fiber having a diameter of about 15, 20, 25, 30, 35, 40, 45, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300, 310, 320, 33, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1000 nanometers, 10, 20, 30, 40, or about 50 micrometers.

In one embodiment, the methods of the invention result in the fabrication of a plurality of aligned (e.g., uniaxially aligned) micron, submicron or nanometer dimension polymeric fibers.

In other embodiments of the invention, the plurality of micron, submicron or nanometer dimension polymeric fibers are contacted with additional agents, e.g., a plurality of living cells, e.g., muscle cells, neuron cells, endothelial cells, and epithelial cells; biologically active agents, e.g., lipophilic peptides, lipids, nucleotides; fluorescent molecules, metals, ceramics, nanoparticles, and pharmaceutically active agents.

In certain embodiments of the invention the polymeric fibers contacted with living cells are cultured in an appropriate medium for a time until, e.g., a living tissue is produced.

In still other embodiments, the polymer is contacted with living cells during the fabrication process such that fibers populated with cells or fibers surrounded (partially or totally) with cells are produced. The polymer may also be contacted with additional agents, such as proteins, nucleotides, lipids, drugs, pharmaceutically active agents, biocidal and antimicrobial agents during the fabrication process such that functional micron, submicron or nanometer dimension polymeric fibers are produced which contain these agents. For example, alginate fibers comprising living cells may be fabricated by providing living cells in a solution of cell media that contains calcium chloride at a concentration that maintains cell viability and is sufficient to crosslink the alginate polymer.

In other aspects, the present invention provides the polymeric fibers produced using the methods and devices of the invention, as well as tissues, membranes, filters, biological protective textiles, biosensor devices, food products, and drug delivery devices comprising the polymeric fibers of the invention.

In another aspect, the present invention provides methods for identifying a compound that modulates a tissue function. The methods include, providing a tissue produced according to the methods of the invention; contacting the tissue with a test compound; and determining the effect of the test compound on a tissue function in the presence and absence of the test compound, wherein a modulation of the tissue function in the presence of the test compound as compared to the tissue function in the absence of the test compound indicates that the test compound modulates a tissue function, thereby identifying a compound that modulates a tissue function.

In yet another aspect, the present invention provides methods for identifying a compound useful for treating or preventing a tissue disease. The methods include, providing a tissue produced according to the methods of the invention; contacting the tissue with a test compound; and determining the effect of the test compound on a tissue function in the presence and absence of the test compound, wherein a modulation of the tissue function in the presence of said test compound as compared to the tissue function in the absence of the test compound indicates that the test compound modulates a tissue function, thereby identifying a compound useful for treating or preventing a tissue disease.

The tissue function may be any suitable physiological activity associate with the particular tissue type, e.g., a biomechanical activity, e.g., contractility, cell stress, cell swelling, and rigidity, or an electrophysiological activity.

In one embodiment, the methods include applying a stimulus to the tissue.

In one embodiment, a plurality of living tissues is contacted with a test compound simultaneously.

In one aspect, the present invention provides methods for fabricating one or more micron, submicron or nanometer dimension poly-paraphenylene terephthalamide fibers. The methods include providing a poly-paraphenylene terephthalamide solution; rotating the poly-paraphenylene terephthalamide solution about an axis of rotation to cause ejection of the poly-paraphenylene terephthalamide solution in one or more jets; and collecting the one or more jets of the poly-paraphenylene terephthalamide in water to cause formation of one or more micron, submicron or nanometer dimension poly-paraphenylene terephthalamide fibers.

In another aspect, the present invention provides methods for fabricating one or more micron, submicron or nanometer dimension poly-paraphenylene terephthalamide fibers. The methods include providing a device of the invention; using the motion generator to rotate the reservoir about an axis of rotation to cause ejection of a poly-paraphenylene terephthalamide polymer solution in one or more jets; and collecting the one or more jets of the poly-paraphenylene terephthalamide in the liquid held in the collection device to cause formation of the one or more micron, submicron or nanometer dimension poly-paraphenylene terephthalamide fibers, wherein the liquid is water.

In another aspect, the present invention provides methods for fabricating a sheet of poly-paraphenylene terephthalamide nanometer fibers. The methods include providing a poly-paraphenylene terephthalamide solution; rotating the poly-paraphenylene terephthalamide solution about an axis of rotation to cause ejection of the poly-paraphenylene terephthalamide solution in one or more jets; and collecting the one or more jets of the poly-paraphenylene terephthalamide in water to cause formation of the sheet of micron, submicron or nanometer dimension fibers comprising poly-paraphenylene terephthalamide.

In another aspect, the present invention provides methods for fabricating a sheet of poly-paraphenylene terephthalamide nanofibers. The methods include providing a device of the invention; using the motion generator to rotate the reservoir about an axis of rotation to cause ejection of a poly-paraphenylene terephthalamide solution in one or more jets; and collecting the one or more jets of the poly-paraphenylene terephthalamide in the liquid held in the collection device to cause formation of the poly-paraphenylene terephthalamide nanofibers, wherein the liquid is water.

In one aspect, the present invention provides methods for fabricating one or more micron, submicron or nanometer dimension poly-paraphenylene terephthalamide fibers. The methods include providing a poly-paraphenylene terephthalamide solution; rotating the poly-paraphenylene terephthalamide solution about an axis of rotation to cause ejection of the poly-paraphenylene terephthalamide solution in one or more jets; generating a liquid vortex in a collection device for collecting the one or more jets of the poly-paraphenylene terephthalamide, the liquid vortex including a central air gap; and collecting the one or more jets of the poly-paraphenylene terephthalamide in the collection device, wherein the one or more jets are initially ejected through the air gap of the liquid vortex and subsequently through the liquid in the liquid vortex of the collection device; wherein the ejection of the poly-paraphenylene terephthalamide into the air gap and subsequently into the liquid in the collection device causes formation of one or more micron, submicron or nanometer dimension poly-paraphenylene terephthalamide fibers, wherein the liquid is water.

In another aspect, the present invention provides methods for fabricating one or more micron, submicron or nanometer dimension poly-paraphenylene terephthalamide fibers. The methods include providing a device of the invention; using the first motion generator to rotate the reservoir about an axis of rotation to cause ejection of the poly-paraphenylene terephthalamide in one or more jets; using the second motion generator to rotate the liquid in the collection device to generate the liquid vortex; and collecting the one or more jets of the poly-paraphenylene terephthalamide in the air gap of the liquid vortex and subsequently in the liquid of the liquid vortex of the collection device to cause formation of the one or more micron, submicron or nanometer dimension poly-paraphenylene terephthalamide fibers, wherein the liquid is water.

In another aspect, the present invention provides methods for fabricating a sheet of poly-paraphenylene terephthalamide nanofibers. The methods include providing a poly-paraphenylene terephthalamide solution; rotating the poly-paraphenylene terephthalamide solution about an axis of rotation to cause ejection of the poly-paraphenylene terephthalamide solution in one or more jets; generating a liquid vortex in a collection device for collecting the one or more jets of the poly-paraphenylene terephthalamide, the liquid vortex including a central air gap; and collecting the jets of the poly-paraphenylene terephthalamide in the collection device, wherein the one or more jets are initially ejected through the air gap of the liquid vortex and subsequently through the liquid in the liquid vortex of the collection device; wherein the ejection of the poly-paraphenylene terephthalamide into the air gap and subsequently into the liquid in the collection device causes formation of a sheet of micron, submicron or nanometer dimension poly-paraphenylene terephthalamide fibers, wherein the liquid is water.

In another aspect, the present invention provides methods for fabricating a sheet of poly-paraphenylene terephthalamide nanofibers. The methods include providing a device of the invention using the first motion generator to rotate the reservoir about an axis of rotation to cause ejection of the poly-paraphenylene terephthalamide in jets; using the second motion generator to rotate the liquid in the collection device to generate the liquid vortex; and collecting the jets of the poly-paraphenylene terephthalamide in the air gap of the liquid vortex and subsequently in the liquid of the liquid vortex of the collection device to cause formation of the one or more micron, submicron or nanometer dimension poly-paraphenylene terephthalamide fibers, wherein the liquid is water.

In one aspect, the present invention provides poly-paraphenylene terephthalamide nanofibers and sheets prepared according to the methods of the invention.

In one aspect, the present invention provides poly-paraphenylene terephthalamide nanofibers and sheet prepared using the device of the invention.

In one aspect, the present invention provides textiles comprising a poly-paraphenylene terephthalamide nanofiber or poly-paraphenylene terephthalamide sheet prepared according to the methods of the invention.

In one embodiment, the sheets of poly-paraphenylene terephthalamide nanofibers have a spacing between individual fibers of about 300 to about 1000 nm.

In another embodiment, the average diameter of a nanofiber in a sheet of poly-paraphenylene terephthalamide nanofibers, comprising has an average diameter of about 0.5 to about 5 μm.

In another embodiment, the sheets of poly-paraphenylene terephthalamide nanofibers have a thickness of about 0.1 to about 100 cm.

In another aspect, the present invention provides a personal protection device, e.g., a bulletproof and/or a bladeproof vest, an athletic wear, e.g., a glove, a shirt, which is made using the foregoing poly-paraphenylene terephthalamide nanofibers and sheets.

BRIEF DESCRIPTION OF THE DRAWINGS

The foregoing and other objects, aspects, features, and advantages of exemplary embodiments will become more apparent and may be better understood by referring to the following description taken in conjunction with the accompanying drawings, in which.

Figure 6:
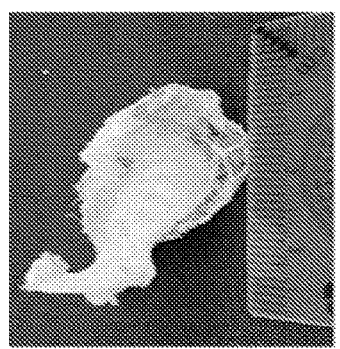
FIGS. 6A and 6B are macroscopic images of (a) DNA nanofibers and (b) alginate nanofibers produced by exemplary devices and methods before alignment.
Figure 6:
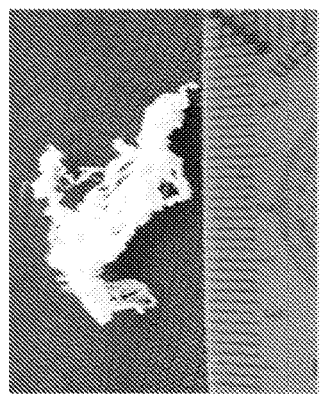
Figure 7:
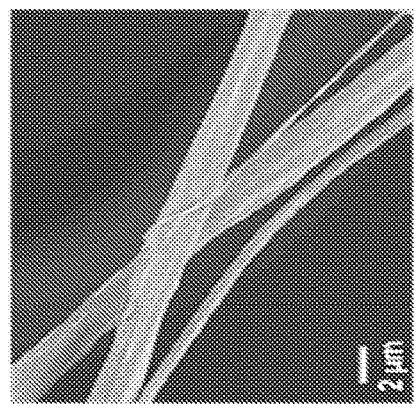
FIGS. 7A and 7B are scanning electron micrographs (SEM) images of (a) DNA nanofibers (b) and alginate nanofibers.
Figure 7:
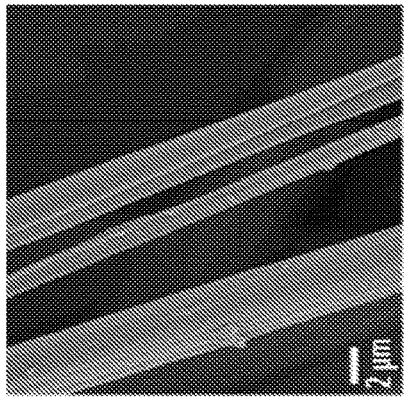

For FIGS. 6 and 7, the DNA nanofibers were fabricated using a solution of 5% DNA dissolved in a 7:3 mixture of water:ethanol and rotating at 16,000 rpm into a 95% ethanol solution within the collection device and the alginate nanofibers were fabricated using a 5% alginate solution prepared in water and rotating at 80,000 rpm into a solution of 1% $CaCl_2$ within the collection device.

Figure 8:
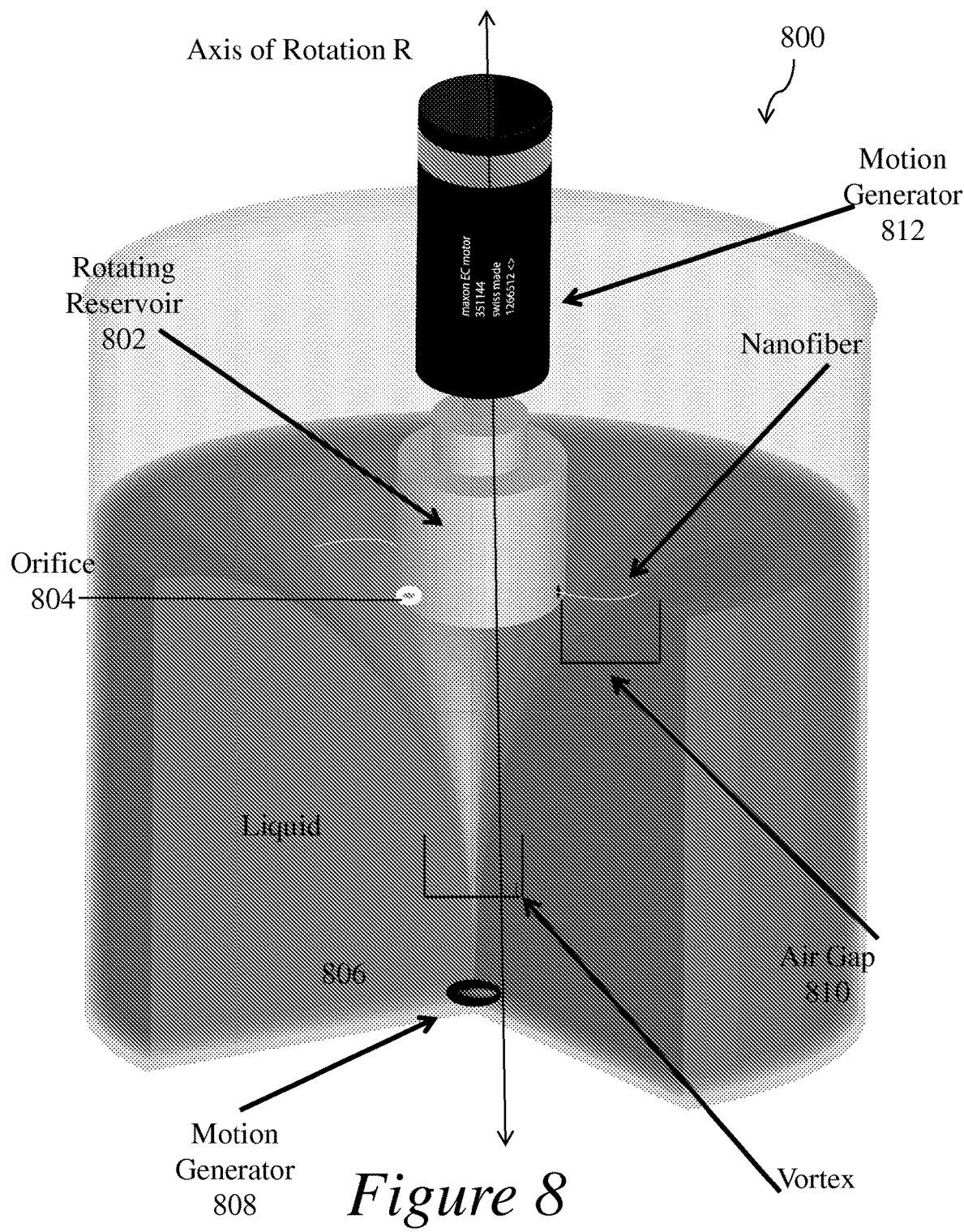

FIG. 8 illustrates an exemplary fiber formation device for forming micron, submicron or nanometer dimension polymeric fibers.

Figure 9:
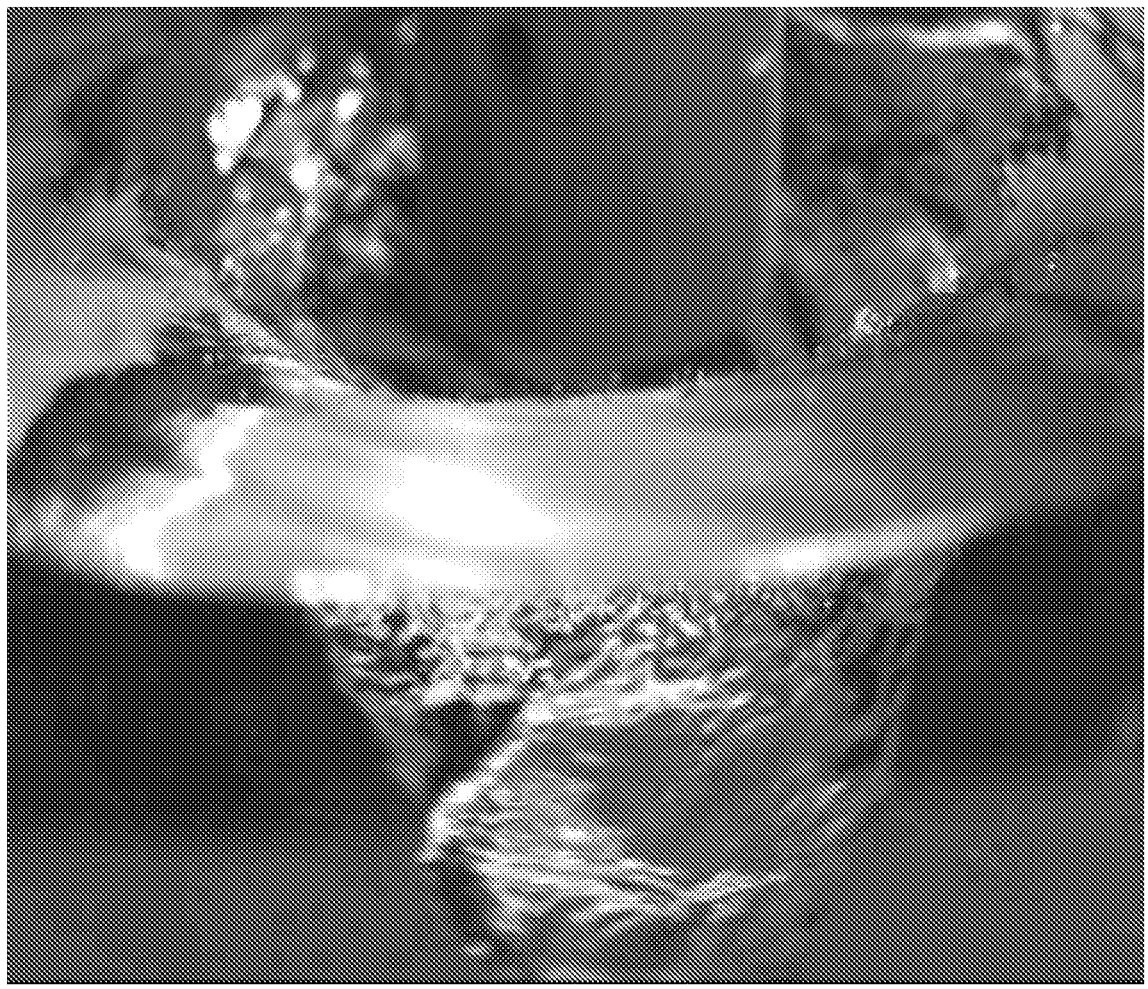
Figure 10:
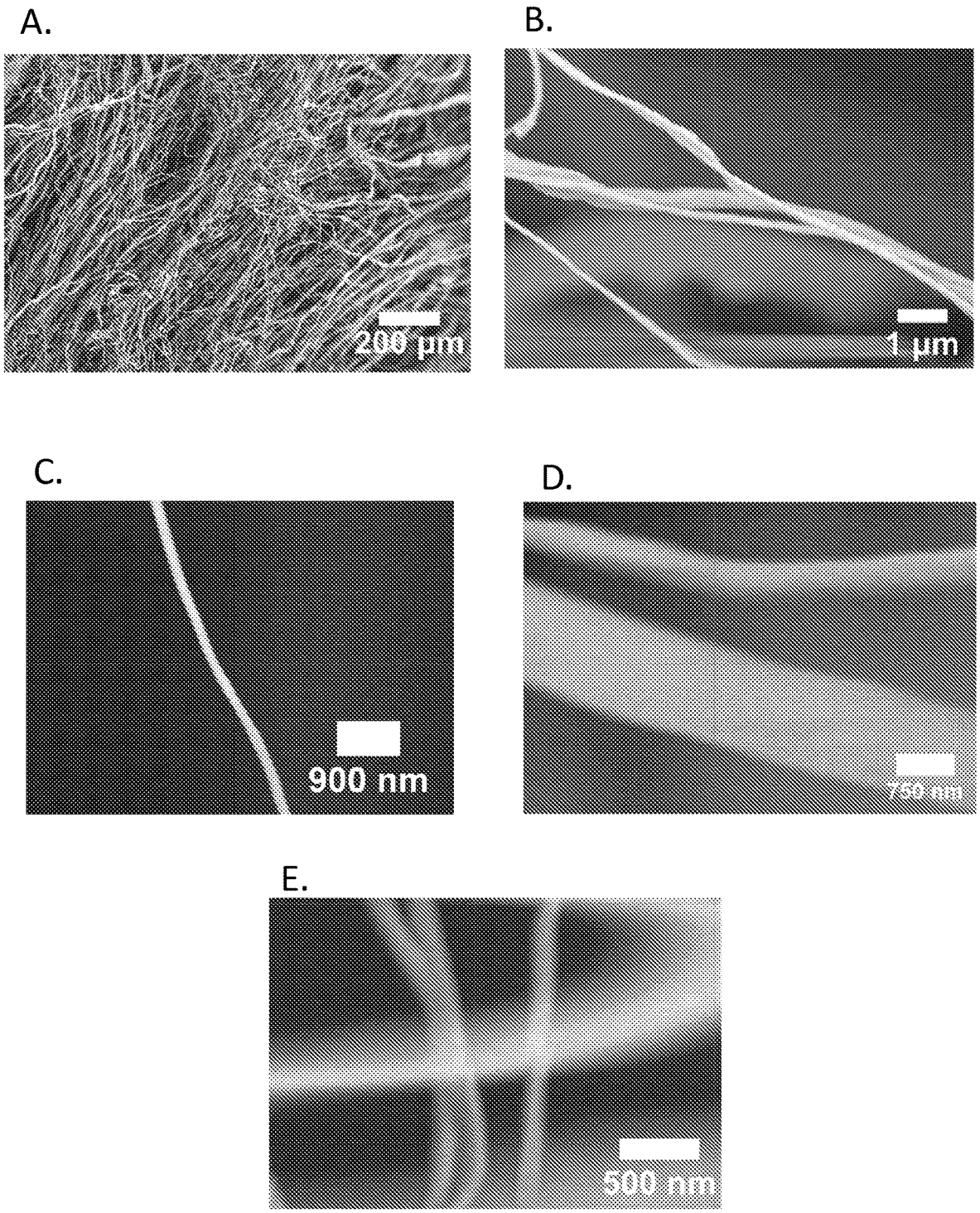

FIG. 9 depicts the generation of a liquid vortex including an air gap in the collection device of an exemplary fiber formation device illustrated in FIG. 8 for forming micron, submicron or nanometer dimension polymeric fibers.

FIGS. 10A-10E are scanning electron micrographs (SEM) images of poly-paraphenylene terephthalamide nanofibers produced by exemplary devices and methods of the invention.

Figure 11:
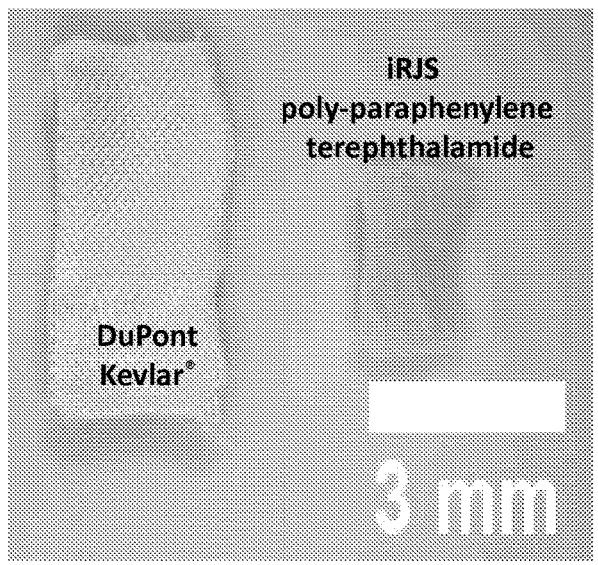
Figure 11:
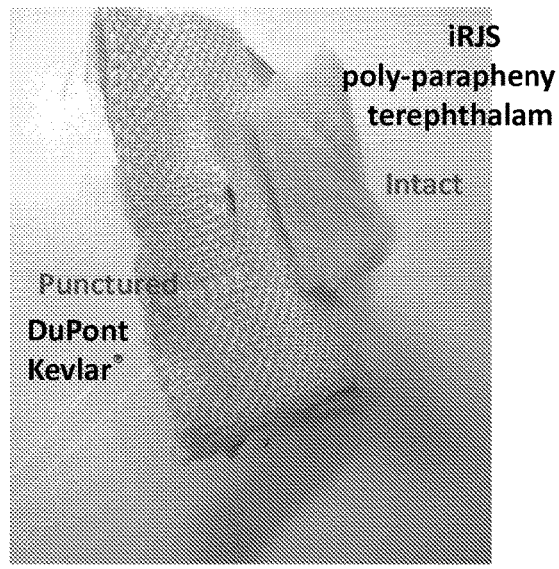
Figure 11:
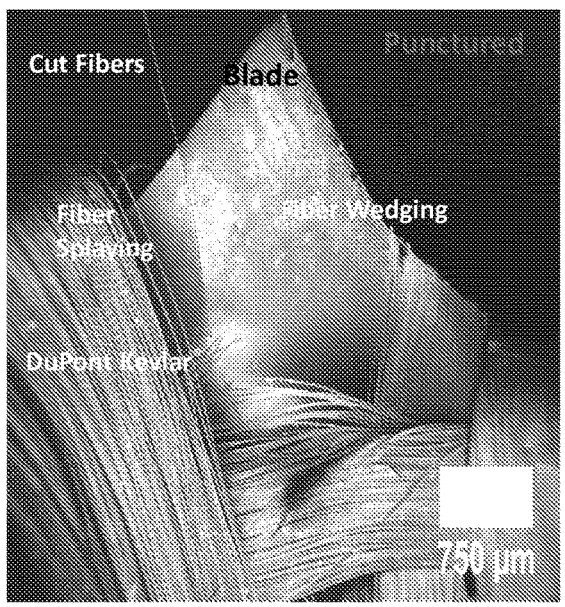
Figure 11:
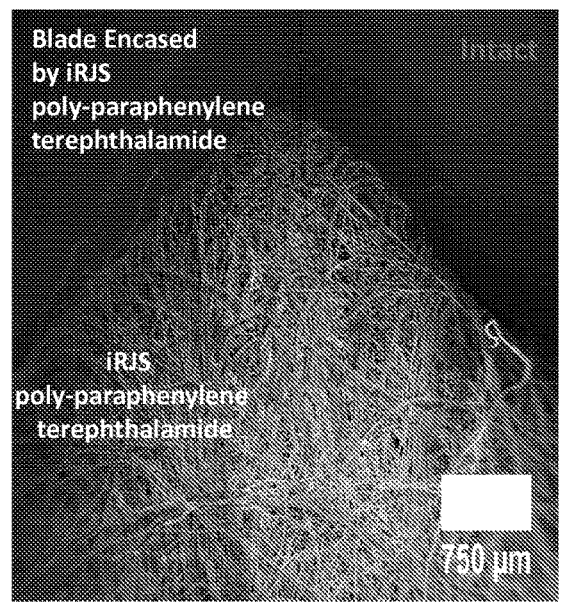
Figure 11:
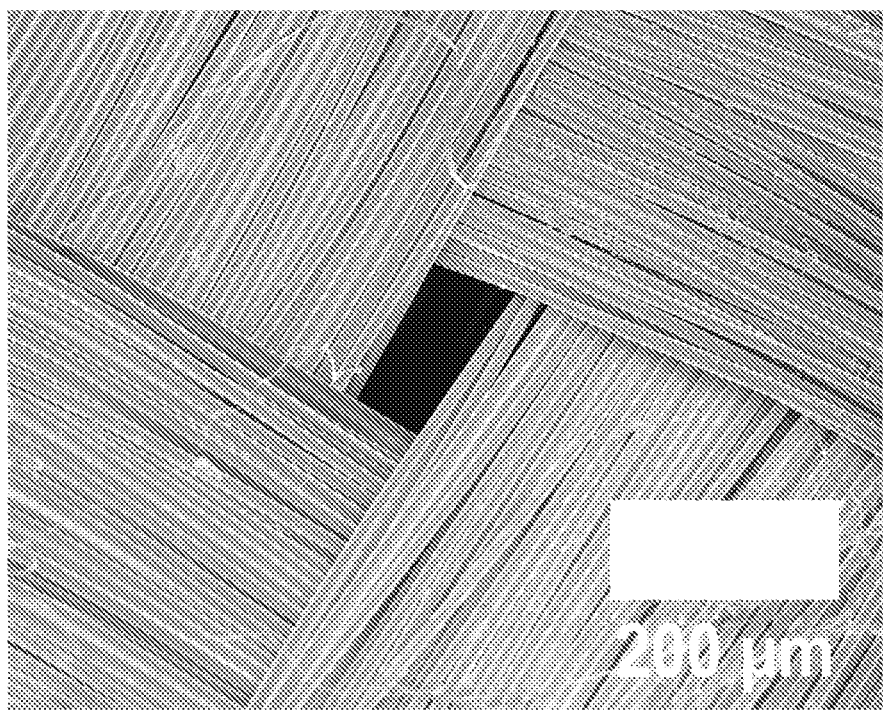
Figure 11:
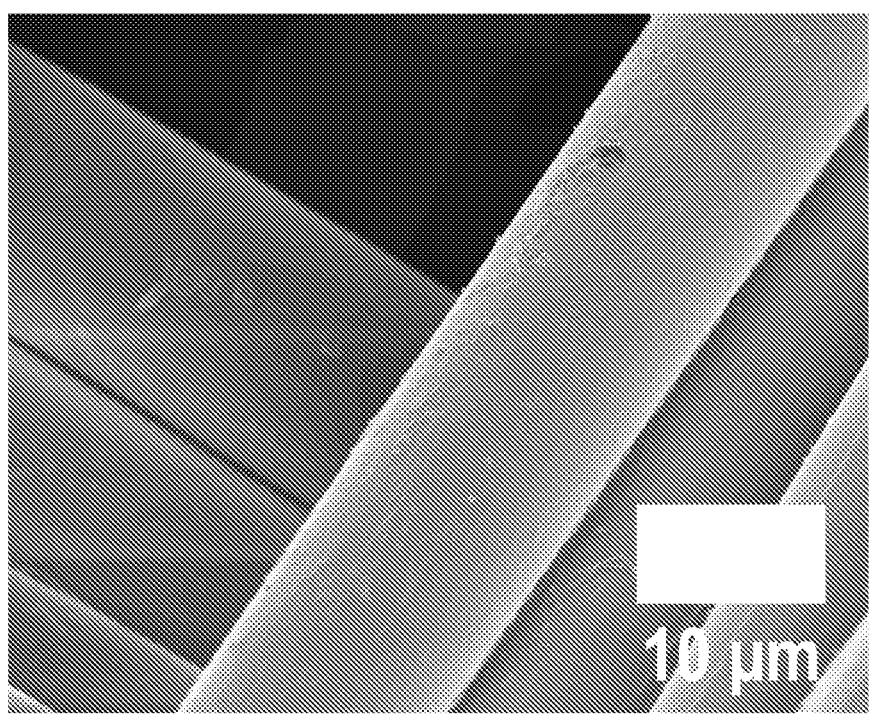

FIG. 11A is an image of a poly-paraphenylene terephthalamide fabric from DuPont and a poly-paraphenylene terephthalamide nanofiber sheet produced by exemplary devices and methods of the invention. FIGS. 11B-11D are images of a poly-paraphenylene terephthalamide fabric from DuPont (11B, left, and 11C) and a poly-paraphenylene terephthalamide nanofiber sheet produced by exemplary devices and methods of the invention (11B, right, and 11D) following a puncture test. FIGS. 11E and 11F are images of a poly-paraphenylene terephthalamide fabric from DuPont depicting the weave of the fibers.

DETAILED DESCRIPTION

Although devices and methods for the production of polymeric fibers employing rotational motion have been previously described (see, e.g., U.S. Patent Publication No. U.S. 2012/0135448 and PCT Publication No. WO 2012/068402), fabrication of polymeric fibers using water soluble polymers and/or polymer solutions which require on-contact crosslinking and/or precipitation to form physically and chemically stable polymeric fibers remains challenging.

For example, until the present invention, it was challenging to form polymeric fibers using polymers dissolved in slowly evaporating solvents, e.g., aqueous solvents, from polymers that require on-contact cross-linking (e.g., alginate) and/or from a polymer that cannot be readily dissolved at a high enough concentrations to provide sufficient viscosity for random entanglement and solvent evaporation to form polymeric fibers (e.g., deoxyribonucleic acid, polyurethane-polyurea copolymer, and polyacrylonitrile), and/or a polymer that requires precipitation (e.g., deoxyribonucleic acid), and/or a polymer dissolved in water at low concentrations to form polymeric fibers, and/or a polymer that requires both extension in air and precipitation (e.g., polyamides, e.g., liquid crystalline polymers, e.g., poly-paraphenylene terephthalamide and poly(p-phenylene benzobisoxazole)).

Accordingly, the present invention solves these problems by providing devices and methods which generally include extruding a polymer solution through one or more orifices of a rotating reservoir into a liquid such that a polymeric fiber is solidified and formed upon contact with the liquid in the collection device. In some embodiments, the orifices of the reservoir may be completely or partially submerged in the liquid in the collection device in order to eject the polymer from the reservoir directly into the liquid. In other embodiments, the orifices of the reservoir are positioned above the liquid in the collection device such that the polymer extruded from the orifice contacts air prior to contacting the liquid in the collection device.

Exemplary embodiments provide improved systems, devices, and methods for forming micron, submicron or nanometer dimension polymeric fibers, without employing electrical fields, e.g., a high voltage electrical field, to form the polymeric fibers.

Exemplary embodiments employ centrifugal or rotational motion imparted to a reservoir of polymer to eject the polymer through one or more orifices in the reservoir. In some embodiments, the polymer is ejected directly into a liquid held in a collection device for solidification and formation of the polymeric fibers. In other embodiments, the polymer is ejected into an air gap generated by generating a liquid vortex in the liquid in the collection device. In some embodiments, upon contact of the polymer with the liquid held in the collection device, the interaction of the two materials causes precipitation and/or cross-linking of the polymer. Exemplary embodiments also enable tuning of the orientation, alignment and diameter of the polymeric fibers.

The terms "fiber" and "polymeric fiber" are used herein interchangeably, and both terms refer to fibers having micron, submicron, and nanometer dimensions. A "chemically and physically stable polymeric fiber" is one that shows substantially no signs of, e.g., loss of strength measured by, e.g., uniaxial tensile testing, and/or degradation rate in culture with media or cells measured by, e.g., weight of the fibers over time.

Exemplary devices and methods may be used to form a single, continuous polymeric fiber or a plurality of polymeric fibers of the same or different diameters, e.g., diameters about 25 nanometers to about 50 micrometers, about 100 nanometers to about 1 micrometer, about 500 nanometers to about 100 micrometers, 25 micrometers to about 100 micrometers, or about 5, 20, 25, 30, 35, 40, 45, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300, 310, 320, 33, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1000 nanometers, 10, 20, 30, 40, or about 50 micrometers. Sizes and ranges intermediate to the recited diameters are also part of the invention.

The polymeric fibers formed using the methods and devices of the invention may be of any length. In one embodiment, the length of the polymeric fibers is dependent on the length of time the device is in motion and/or the amount of polymer fed into the system. For example, the polymeric fibers may be about 1 nanometer, about 10 feet, or about 500 yards. Additionally, the polymeric fibers may be cut to a desired length using any suitable instrument.

In one embodiment, the methods and device of the invention produce about 0.5, 1, 2, 3, 4, 5, 6, 7, 8, 9, 10, 11, 12, 13, 14, or about 15 grams of polymeric fiber per hour.

In one embodiment of the invention, a plurality of micron, submicron or nanometer dimension polymeric fibers are formed. The plurality of micron, submicron or nanometer dimension polymeric fibers may be of the same diameter or of different diameters.

In one embodiment, the methods of the invention result in the fabrication of a plurality of aligned (e.g., uniaxially aligned) micron, submicron or nanometer dimension polymeric fibers, e.g., a sheet of polymeric fibers.

The fibers produced according to the methods disclosed herein can be, for example, used as extracellular matrix and, together with cells, may also be used in forming engineered tissue. Such tissue is useful not only for the production of prosthetic devices and regenerative medicine, but also for investigating tissue developmental biology and disease pathology, as well as in drug discovery and toxicity testing. The polymeric fibers of the invention may also be combined with other substances, such as, therapeutic agents, in order to deliver such substances to the site of application or implantation of the polymeric fibers. The polymeric fibers produced according to the methods disclosed herein may also be used to generate food products, thread, fabrics, membranes and filters.

A. Exemplary Fiber Formation Devices

Exemplary embodiments provide systems, devices and methods for forming three-dimensional micron, submicron and nanometer dimension fibers from a material solution by imparting rotational and/or linear motion to the material solution. In exemplary embodiment, the devices are substantially void of an electric field and do not require an electrical field in order to generate the polymeric fiber. In some embodiments, the devices are free of a needle.

Exemplary fiber formation devices and methods may be used to make fibers from a range of materials. Exemplary materials include polymers that require on-contact cross-linking (e.g., alginate) and/or from a polymer that cannot be readily dissolved at a high enough concentrations to provide sufficient viscosity for random entanglement and solvent evaporation to form polymeric fibers (e.g., deoxyribonucleic acid, polyurethane-polyurea copolymer, and polyacrylonitrile), and/or a polymer that requires precipitation (e.g., deoxyribonucleic acid), and/or a polymer dissolved in water at low concentrations to form polymeric fibers, and/or a polymer that requires both extension in air and precipitation (e.g., polyamides, e.g., liquid crystalline polymers, e.g., poly-paraphenylene terephthalamide, and poly(p-phenylene benzobisoxazole)).

Exemplary fiber formation devices may have many applications including, but not limited to, mass production of polymer fibers, production of ultra-aligned scaffolds, bio-functional scaffolds for in vitro tissue engineering applications, bio-functional scaffolds for in vivo tissue engineering applications, bio-functional suture threads, ultra-strong fiber and fabric production, bio-functional protein or polymer filters, protective clothing or coverings, etc.

Figure 1:
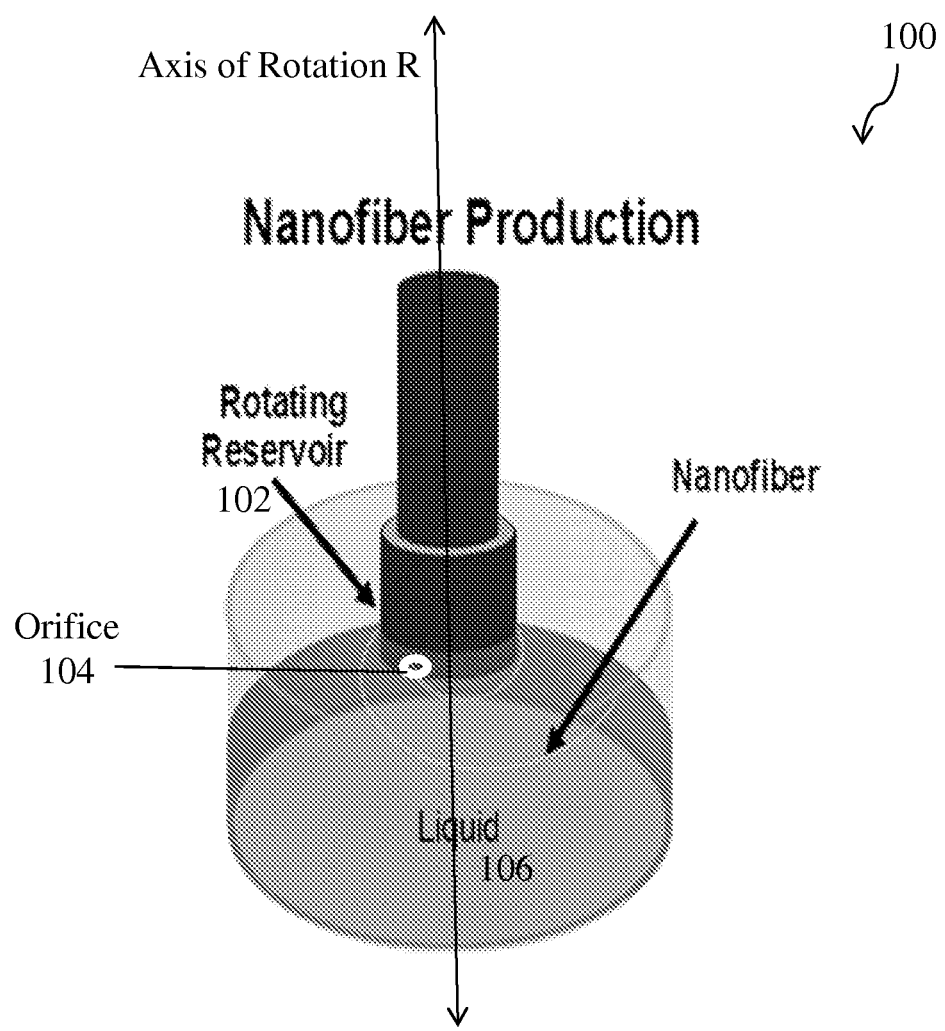
FIG. 1 illustrates an exemplary fiber formation device for forming micron, submicron or nanometer dimension polymeric fibers.

In an exemplary fiber formation device 100 illustrated in FIG. 1, one or more reservoirs 102 are provided for holding one or more material solutions (e.g., polymer in solution) for forming polymeric fibers. The reservoir 102 may include one or more orifices or openings 104 for providing an outlet to the material solution to the exterior of the reservoir 102. The fiber formation device 100 includes one or more collection devices 106, e.g., a beaker, a tub, a plate, bobbin, a drum, etc., for collecting the fibers ejected through the orifice 104 of the reservoir 102. The collection device 106 may hold a liquid that enables precipitation and/or on-contact cross-linking of the polymeric fibers upon contact of the material solution with the liquid, for example, water, ethanol (e.g., about 30, 35, 40, 45, 50, 55, 60, 65, or about 70% ethanol), DMF (e.g., about 20, 25, 30, 35, 40, 45, or 50% DMF) calcium chloride, N-methyl-pyrrolidone and calcium chloride, sulfuric acid, and the like.

In the exemplary embodiment illustrated in FIG. 1, the collection device 106 and the reservoir 102 are configured and positioned so that the orifices 104 of the reservoir 102 are at least partially submerged in the liquid in the collection device 106. The orifices 104 may be submerged partially or completely in the liquid in the collection device 106. In an exemplary embodiment, the collection device 106 is disposed vertically below the reservoir 102. The configuration of the exemplary fiber formation device 100 creates a liquid-to-liquid interface at the orifices 104 between the material solution in the reservoir 102 and the liquid in the collection device 106. The liquid-to-liquid interface may be free of ambient air in some embodiments. The liquid-to-liquid interface at the orifices 104 causes the material solution ejected from the orifices 104 to directly enter the liquid held in the collection device 106, which causes solidification and formation of one or more micron, submicron or nanometer dimension polymeric fibers.

Although the exemplary collection device 106 illustrated in FIG. 1 is represented as being stationary, other exemplary collection devices may be moving, e.g., rotating and/or oscillating. In some exemplary embodiments, the velocity of the collection device 106, linear or rotational, may be kept substantially constant during a fiber formation session or may be increased or decreased during a fiber formation session. Exemplary linear velocities of the collection device 106 may range from about 5 m/s to about 40 m/s in some exemplary embodiments, but are not limited to this exemplary range.

The reservoir 102 may be coupled directly or indirectly to one or more motion generators, e.g., a rotating motor, etc., that impart a motion to the reservoir 102. The motion imparted to the reservoir 102 may be configured to impart sufficient shear force to the material solution in the reservoir 102 for a sufficient time such that the material solution is ejected or extruded from the reservoir 102, thereby forming one or more micron, submicron or nanometer dimension polymeric fibers. Exemplary embodiments may use different combinations of motion generators to create and control desired weaves and/or alignments of the fibers formed by the motion of the reservoir 102.

In one embodiment, a motion generator may be used to impart a rotational motion to the reservoir 102 so that the reservoir 102 spins about a central axis of rotation R. An exemplary rotational motion generator may be provided in accordance with the disclosure of a rotational motion generator in U.S. Patent Publication No U.S. 2012/0135448 and PCT Publication No. WO 2012/068402, the entire contents of each of which are incorporated herein by reference.

In another embodiment, a motion generator may be used to impart a linear motion to the reservoir 102 so that the reservoir 102 moves back and forth along the central axis R. In another embodiment, a motion generator may impart both a rotational motion and a linear motion to the reservoir 102. In other exemplary embodiments, the motion generator 110 may impart other types of motions to the reservoir 102, e.g., irregular motions, complex motion patterns, linear motion along different axes, rotational motion about different axes, motion that changes between linear and rotational, etc.

The reservoir 102 may be coupled to the motion generator using one or more mechanical coupling members, e.g., a rod, piston, etc., that reliably and efficiently transfer the motion generated by the generator to the reservoir 102. The motion generator may be coupled to an electrical power source (not shown), e.g., electrical mains or one or more batteries, that supplies electrical power to power the generator.

In operation, as the motion generator moves the reservoir 102 in a rotational manner or back and forth in a linear manner, the inertia of the material solution in the reservoir 102 resists the motion of the motion generator and the reservoir 102. This causes the material solution to be pulled against one or more walls of the reservoir 102 and to be ejected or extruded through one or more orifices 104 that are present on the walls. The material solution forms one or more jets as it is pulled through the orifices 104. The jets exit the reservoir 102 through the orifices 104 and enter the liquid held in the collection device 106. The interaction of the material jets with the liquid causes formation and solidification of the micron, submicron or nanometer dimension polymeric fibers. In some cases, the interaction of the material jets with the liquid causes precipitation and/or on-contact cross-linking of the polymeric fibers.

In an alternative embodiment, the reservoir 102 may be pressurized to eject the polymer material from the reservoir through the one or more orifices 104. For example, a mechanical pressurizer may be applied to one or more surfaces of the reservoir to decrease the volume of the reservoir, and thereby eject the material from the reservoir. In another exemplary embodiment, a fluid pressure may be introduced into the reservoir to pressurize the internal volume of the reservoir, and thereby eject the material from the reservoir.

In exemplary embodiments that employ motion, the velocity of the reservoir 102, linear or rotational, may be kept substantially constant during a fiber formation session or may be increased or decreased during a fiber formation session. Rotational speeds of the reservoir 102 in exemplary embodiments may range from about 1,000 rpm-400,000 rpm, for example, about 1,000 rpm to about 40,000 rpm, about 1,000 rpm to about 20,000 rpm, about 3,000 rpm-90,000 rpm, about 3,000 rpm-50,000 rpm, about 3,000 rpm-25,000 rpm, about 5,000 rpm-20,000 rpm, about 5,000 rpm to about 15,000 rpm, about 50,000 rpm to about 100,000 rpm, or about 50,000 rpm to about 400,000 rpm, e.g., about 1,000, 1,500, 2,000, 2,500, 3,000, 3,500, 4,000, 4,500, 5,000, 5,500, 6,000, 6,500, 7,000, 7,500, 8,000, 8,500, 9,000, 9,500,10,000, 10,500, 11,000, 11,500, 12,000, 12,500, 13,000, 13,500, 14,000, 14,500, 15,000, 15,500, 16,000, 16,500, 17,000, 17,500, 18,000, 18,500, 19,000, 19,500, 20,000, 20,500, 21,000, 21,500, 22,000, 22,500, 23,000, 23,500, 24,000, 32,000, 50,000, 55,000, 60,000, 65,000, 70,000, 75,000, 80,000, 85,000, 90,000, 95,000, 100,000, 105,000, 110,000, 115,000, 120,000, 125,000, 130,000, 135,000, 140,000, 145,000, 150,000 rpm, about 200,000 rpm, 250,000 rpm, 300,000 rpm, 350,000 rpm, or 400,000 rpm. Ranges and values intermediate to the above recited ranges and values are also contemplated to be part of the invention.

In certain embodiments, rotating speeds of about 50,000 rpm-400,000 rpm are intended to be encompassed by the methods of the invention. In one embodiment, devices employing rotational motion may be rotated at a speed greater than about 50,000 rpm, greater than about 55,000 rpm, greater than about 60,000 rpm, greater than about 65,000 rpm, greater than about 70,000 rpm, greater than about 75,000 rpm, greater than about 80,000 rpm, greater than about 85,000 rpm, greater than about 90,000 rpm, greater than about 95,000 rpm, greater than about 100,000 rpm, greater than about 105,000 rpm, greater than about 110,000 rpm, greater than about 115,000 rpm, greater than about 120,000 rpm, greater than about 125,000 rpm, greater than about 130,000 rpm, greater than about 135,000 rpm, greater than about 140,000 rpm, greater than about 145,000 rpm, greater than about 150,000 rpm, greater than about 160,000 rpm, greater than about 165,000 rpm, greater than about 170,000 rpm, greater than about 175,000 rpm, greater than about 180,000 rpm, greater than about 185,000 rpm, greater than about 190,000 rpm, greater than about 195,000 rpm, greater than about 200,000 rpm, greater than about 250,000 rpm, greater than about 300,000 rpm, greater than about 350,000 rpm, or greater than about 400,000 rpm.

Exemplary devices employing rotational motion may be rotated for a time sufficient to form a desired polymeric fiber, such as, for example, about 1 minute to about 100 minutes, about 1 minute to about 60 minutes, about 10 minutes to about 60 minutes, about 30 minutes to about 60 minutes, about 1 minute to about 30 minutes, about 20 minutes to about 50 minutes, about 5 minutes to about 20 minutes, about 5 minutes to about 30 minutes, or about 15 minutes to about 30 minutes, about 5-100 minutes, about 10-100 minutes, about 20-100 minutes, about 30-100 minutes, or about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 minutes, or more. Times and ranges intermediate to the above-recited values are also intended to be part of this invention.

In embodiments that employ linear motion, linear speeds of the reservoir 102 may range from about 0.0001 m/s to about 4.2 m/s, but are not limited to this exemplary range.

Comparing some exemplary devices that employ purely linear motion to some exemplary devices that employ purely rotational motion for fiber formation, a linear velocity of about 10.8 m/s corresponds to about 8,000 rpm of rotational velocity, a linear velocity of about 16.2 m/s corresponds to about 12,000 rpm of rotational velocity, and a linear velocity of about 27.1 m/s corresponds to about 20,000 rpm of rotational velocity.

An exemplary reservoir 102 may have a volume ranging from about one nanoliter to about 1 milliliter, about one nanoliter to about 5 milliliters, about 1 nanoliter to about 100 milliliters, or about one microliter to about 100 milliliters, for holding the liquid material. Some exemplary volumes include, but are not limited to, about one nanoliter o about 1 milliliter, about one nanoliter to about 5 milliliters, about 1 nanoliter to about 100 milliliters, one microliter to about 100 microliters, about 1 milliliter to about 20 milliliters, about 20 milliliters to about 40 milliliters, about 40 milliliters to about 60 milliliters, about 60 milliliters to about 80 milliliters, about 80 milliliters to about 100 milliliters, but are not limited to these exemplary ranges. Exemplary volumes intermediate to the recited volumes are also part of the invention. In certain embodiment, the volume of the reservoir is less than about 5, less than about 4, less than about 3, less than about 2, or less than about 1 milliliter. In other embodiments, the physical size of an unfolded polymer and the desired number of polymers that will form a fiber dictate the smallest volume of the reservoir.

In some embodiments, the reservoir 102 may include one or more inlet ports, each coupled to one or more inlet pipes for introducing one or more material solutions and/or one or more other fluids (e.g., air pressure) into the reservoir 102. An exemplary inlet pipe may be coupled to one or more storage devices that store a material solution or to one or more devices that produce a material solution. One or more material solutions may be fed into the reservoir 102 through the inlet port at a constant flow rate or at variable flow rates. In an exemplary embodiment, the inlet port may be closed temporarily or permanently after the reservoir 102 is filled before fiber formation. In another exemplary embodiment, the inlet port may remain open for continuous or intermittent filling of the reservoir 102 during fiber formation. In an exemplary embodiment, the reservoir 102 may be pre-filled and the filled reservoir 102 may not include the inlet pipe and may have one or more temporarily or permanently sealed inlet ports. In another exemplary embodiment, the inlet port may remain coupled to the inlet pipe and the reservoir 102 may be filled continuously or in one or more sessions during fiber formation.

Exemplary orifices 104 may have any suitable cross-sectional geometry including, but not limited to, circular (as illustrated in the exemplary embodiment of FIG. 1), oval, square, rectangular, etc. In an exemplary embodiment, one or more nozzles may be provided associated with an exemplary orifice 104 to provide control over one or more characteristics of the material solution exiting the reservoir 102 through the orifice including, but not limited to, the flow rate, speed, direction, mass, shape and/or pressure of the material solution. The locations, cross-sectional geometries and arrangements of the orifices 104 on the reservoir 102, and/or the locations, cross-sectional geometries and arrangements of the nozzles on the orifices 104, may be configured based on the desired characteristics of the resulting fibers and/or based on one or more other factors including, but not limited to, viscosity of the material solution, the rate of solvent evaporation during fiber formation, etc.

Exemplary orifice lengths that may be used in some exemplary embodiments range between about 0.001 m and about 0.1 m, between about 0.001 m and about 0.01 m, between about 0.001 m and about 0.005 m, between about 0.002 m and about 0.005 m, between about 0.001 m and about 0.05 m, between about 0.0015 m and about 0.007 m, between about 0.002 m and about 0.007 m, between about 0.0025 m and about 0.0065 m, between about 0.002 m and about 0.006 m, e.g., about 0.0015, 0.002, 0.0025, 0.003, 0.0035, 0.004, 0.0045, 0.005, 0.0055, 0.006, 0.0065, 0.007, 0.0075, 0.008, 0.0085, 0.009, 0.0095, 0.01, 0.015, 0.02, 0.025, 0.03, 0.035, 0.04, 0.045, 0.05, 0.055, 0.06, 0.065, 0.07, 0.075, 0.08, 0.085, 0.09, 0.095, or 0.1 m. Ranges and values intermediate to the above recited ranges and values are also contemplated to be part of the invention.

Exemplary orifice diameters that may be used in some exemplary embodiments range between about 0.05 µm and about 1000 µm, e.g., between about 0.05 and about 500, between about 0.05 and 100, between about 0.1 and 1000, between about 0.1 and 500, between about 0.1 and 100, between about 1 and 1000, between about 1 and 500, between about 1 and 100, between about 10 and 1000, between about 10 and 500, between about 10 and 100, between about 50 and 1000, between about 50 and 500, between about 50 and 100, between about 100 and 1000, between about 100 and 500, between about 150 and 500, between about 200 and 500, between about 250 and 500, between about 250 and 450, 0.05, 0.06, 0.07, 0.08, 0.09, 0.1, 0.15, 0.2, 0.225, 0.25, 0.275, 0.3, 0.325, 0.35, 0.375, 0.4, 0.425, 0.45, 0.475, 0.5, 0.525, 0.55, 0.575, 0.6, 0.625, 0.65, 0.675, 0.7, 0.725, 0.75, 0.075, 0.8, 0.825, 0.85, 0.825, 0.9, 0.925, 0.95, 0.975, 1.0, 1.5, 2, 2.5, 3, 3.5, 4, 4.5, 5, 5.5, 6, 6.5, 7, 7.5, 8, 8.5, 9, 9.5, 10, 20, 30, 40, 50, 60, 70, 80, 90, 100, 150, 200, 250, 300, 350, 400, 450, 500, 550, 600, 650, 700, 750, 800, 850, 900, 950, or 1000 µm. Ranges and values intermediate to the above recited ranges and values are also contemplated to be part of the invention.

The reservoir and collection device may be constructed of any material, e.g., a material that can withstand heat and/or that is not sensitive to chemical organic solvents. In one embodiment, the reservoir and the collection device are made up of glass or a plastic material, e.g., polypropylene, polyethylene, or polytetrafluoroethylene. In another embodiment, the reservoir and the collection device are made up of a metal, e.g., aluminum, steel, stainless steel, tungsten carbide, tungsten alloys, titanium or nickel.

Any suitable size or geometrically shaped reservoir or collector may be used in the devices of the invention. For example, the reservoir and/or collector may be round, rectangular, or oval. The reservoir and/or collector may be round, oval, rectangular, or a half-heart shape. The collector may also be shaped in the form of any living organ, such as a heart, kidney, liver lobe(s), bladder, uterus, intestine, skeletal muscle, or lung shape, or portion thereof. The collector may further be shaped as any hollow cavity, organ or tissue, such as a circular muscle structure, e.g., a sphincter or iris, or, for the fabrication of protective clothing, a human head, a torso, a hand, etc. These shapes allow the polymeric fibers to be deposited in the form of a living organ for the production of engineered tissue and organs, described in more detail below, or as a glove, a helmet, a vest, or a shirt.

In one embodiment, the devices of the invention further comprise a component suitable for continuously feeding the polymer into the rotating reservoir, such as a spout or syringe pump The reservoir may also include a heating element for heating and/or melting the polymer.

In certain embodiments, the collection device is maintained at about room temperature, e.g., about 20, 21, 22, 23, 24, 25, 26, 27, 28, 29, or about 30° C. and ambient humidity, e.g., about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or about 90% humidity. The devices may be maintained at and the methods may be formed at any suitable temperature and humidity.

In one embodiment of the invention, the device is free of a needle.

In one embodiment, the formed micron, submicron or nanometer dimension polymeric fiber is imaged, e.g., using a scanning electron microscope.

Exemplary fiber formation devices may employ one or more mechanisms to control the force and/or speed with which the material jet leaves the reservoir through one or more orifices. In an exemplary embodiment, the speed (linear and/or rotational) and/or magnitude of the motion (e.g., the distance traveled by the motion generator along a linear axis) of the motion generator may be increased to increase the pressure of the material solution in the reservoir which, in turn, increases the force and/or the speed with which the jets leave the reservoir, and vice versa. In an exemplary embodiment, the material solution may be fed into the reservoir through an inlet port during fiber formation to increase the pressure of the material solution in the reservoir which, in turn, increases the force and/or the speed with which the jets leave the reservoir, and vice versa. In an exemplary embodiment, the material solution may be fed into the reservoir through the inlet port at a faster or a slower rate to increase or decrease, respectively, the pressure of the material solution in the reservoir. This, in turn, raises or lowers, respectively, the force and/or the speed with which the jets leave the reservoir.

Exemplary fiber formation devices may employ the controllable linear motion of the reservoir to control alignment of the resulting fibers. Controlling one or more aspects of the linear motion of an exemplary reservoir enables control over the deposition and alignment of each layer of polymeric fibers onto the collection device. Exemplary aspects of the linear motion that may be controlled in exemplary devices include, but are not limited to, the speed of the linear motion of the reservoir, the force and/or speed with which the material jet leaves the reservoir, the dimensions of the reservoir, etc.

In some exemplary embodiments, the speed with which an exemplary motion generator oscillates the reservoir and/or the collection device affects the pitch of the helical fibers and the spacing between the fibers. An increasing vertical speed of the reservoir and/or the collection device typically results in an increased pitch of the helical fibers. Accordingly, in an exemplary embodiment, the pitch of the fibers formed is increased by increasing the linear speed of the oscillating reservoir and/or the oscillating collection device along the vertical direction, and vice versa. An increasing vertical speed of the reservoir and/or the collection device typically results in an increased spacing between the fibers. Accordingly, in an exemplary embodiment, the fiber spacing formed is increased by increasing the linear speed of the oscillating reservoir and/or the oscillating collection device along the vertical direction, and vice versa.

In some exemplary embodiments, the polymeric fiber configuration formed on the collection device in exemplary devices of the invention, e.g., a mat configuration, a mesh configuration, etc., may be controlled by controlling aspects of the linear motion of the reservoir and/or the collection device. In some exemplary embodiments, the pore sizes formed between fibers of a mesh configuration, e.g., larger or smaller pore sizes, may be controlled by controlling aspects of the linear motion of the reservoir and/or the collection device in exemplary devices. An increasing vertical speed of the reservoir and/or collection device typically results in larger pore sizes of the fibers, and vice versa. Accordingly, in an exemplary embodiment, the pore sizes of a polymeric fiber mesh structure formed is increased by increasing the linear speed of the oscillating reservoir and/or oscillating collection device along the vertical direction, and vice versa. Thus, exemplary devices may be used to form fibers of different porosities, e.g., for filters with varying pore sizes, for a cell-scaffold with a desired pore size which may be used to select a desired cell-scaffold infiltration, etc.

In an exemplary embodiment, as the reservoir and/or the collection device is oscillated in a linear manner while the reservoir is being rotated, the fibers are deposited in a controlled mesh structure, wherein the linear velocity of the reservoir and/or collection device determines the mesh pore size and the pitch of the polymeric fiber mesh structure. The pore size depends on the fiber diameter as well as the fiber pitch. A maximum pore size typically results from large fibers and an approximately 45 degree pitch in one direction. In this exemplary embodiment, fibers exiting the orifices of the reservoir at an approximately 45 degree angle in one direction are deposited in an approximately −45 degree angle in the other direction due to the linear motion. This results in the formation of layers of fibers that overlap each other at approximately 90 degrees.

In another exemplary fiber formation device 800 illustrated in FIG. 8, one or more reservoirs 802 are provided for holding one or more material solutions (e.g., polymer in solution) for forming polymeric fibers. The reservoir 802 may include one or more orifices or openings 804 for providing an outlet to the material solution to the exterior of the reservoir 802. The fiber formation device 800 includes one or more collection devices 806, e.g., a plate, bobbin, etc., for collecting the fibers ejected through the orifice 804 of the reservoir 102. The collection device 806 may hold a liquid that enables precipitation and/or on-contact cross-linking of the polymeric fibers upon contact of the material solution with the liquid, for example, water, ethanol (e.g., about 30, 35, 40, 45, 50, 55, 60, 65, or about 70% ethanol), DMF (e.g., about 20, 25, 30, 35, 40, 45, or about 50% DMF) calcium chloride, N-methyl-pyrrolidone and calcium chloride, sulfuric acid, and the like.

The exemplary device illustrated in FIG. 8 includes a motion generator 808 couplable (e.g., directly or indirectly) to the collection device. The motion generator 808 is configured to impart rotational motion to the liquid in the collection device to generate a liquid vortex including an air gap 810 which is essentially positioned centrally in the liquid vortex in the collection device. The reservoir 802 and the collection device 806 are configured and positioned such that the one or more orifices 804 of the reservoir are not in contact (e.g., not in contact either partially or completely) with the liquid in the collection device 806 but are, rather configured and positioned in the air gap 810 of the liquid vortex in the collection device. In general, the air gap 810 is formed along a central axis of the liquid vortex and abuts the top surface of the liquid in the liquid vortex such that the one or more orifices 804 of the reservoir 802 are positioned below the highest level of the top surface of the liquid in the collection device 806. In exemplary embodiments, the one or more orifices 804 are horizontally spaced from the liquid vortex by a distance of between about 0.1-8.0 cm, between about 1-8.0 cm, between about 1.5-7.5 cm, between about 2.0-7.0 cm, between about 2.5-6.5 cm, between about 2.5-6.0 cm, between about 2.5-5.5 cm, between about 2.5-5.0 cm, between about 3.0-6.0 cm, between about 3.0-5.5 cm, between about 3.0-5.0 cm, e.g., about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 3.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.5, 7.5, 7.6, 7.7, 7.8, 7.9, or about 8.0 cm. Ranges and values intermediate to the above recited ranges and values are also contemplated to be part of the invention. Ejection of the polymer into the air gap extends the fibers and alignment and subsequent contact with the liquid of the liquid vortex in the collection device 806 causes precipitation or cross-linking or formation of one or more micron, submicron or nanometer dimension polymeric fibers. In an exemplary embodiment, the collection device 806 is disposed vertically below the reservoir 802.

The motion generator 808 may further comprise one or more of a motor, one or more magnets, and a heating element for heating the liquid in the collection device 806. The speed of the motion generator 808 may be controllable and used to generate rotational motion of the liquid in the collection device at about 200-1,500 rpm, about 250-1,500 rpm, about 300-1,500 rpm, about 300-1,250 rpm, about 200-1,250 rpm, about 200-500 rpm, about 250-500 rpm, about 200-450 rpm, about 250-450 rpm, about 900-1,300 rpm about 950-1,300 rpm, about 900-1,200 rpm, about 950-1,200 rpm, about 900-1,250 rpm, about 950-1,250 rpm, about 1,000-1,200 rpm, or about 200, 250, 300, 350, 400, 450, 500 550, 600 650, 700, 750, 800, 850, 900, 950, 1,000, 1,050, 1,100, 1,150, 1,200, 1,250, 1,300, 1,350, 1,400, 1,450, or about 1,500 rpm. Ranges and values intermediate to the above recited ranges and values are also contemplated to be part of the invention. The size of, e.g., the collection device, the volume of liquid, and the size of a magnet, will dictate the speed of the motion generator necessary to provide an appropriate distance between a horizontally spaced orifice and the liquid vortex.

The motion generator 808 may comprise a drainage system that imparts the rotational motion to the liquid by draining the liquid through the draining system. A drainage system may be configured in the collection device 806 and couplable to a fluid inlet and a fluid outlet to control flow rate of the liquid in the collection device. The drainage system is configured so a liquid vortex is generated by drainage of the drainage system. The drainage system is controllable to control the flow rate through the drainage system and to control the flow rate through the fluid inlet and fluid outlet.

The reservoir 802 may be coupled directly or indirectly to one or more motion generator 812, e.g., a rotating motor, etc., that impart a motion to the reservoir 802. The motion imparted to the reservoir 802 may be configured to impart sufficient shear force to the material solution in the reservoir 802 for a sufficient time such that the material solution is ejected or extruded from the reservoir 802, thereby forming one or more micron, submicron or nanometer dimension polymeric fibers. Exemplary embodiments may use different combinations of motion generators to create and control desired weaves and/or alignments of the fibers formed by the motion of the reservoir 802.

In one embodiment, a motion generator 812 may be used to impart a rotational motion to the reservoir 802 so that the reservoir 802 spins about a central axis of rotation R. An exemplary rotational motion generator 812 may be provided in accordance with the disclosure of a rotational motion generator in U.S. Patent Publication No U.S. 2012/0135448 and PCT Publication No. WO 2012/068402, the entire contents of each of which are incorporated herein by reference. The motion generators 808 and 812 may impart rotational motion in the same or opposite rotational direction.

In another embodiment, a motion generator 812 may be used to impart a linear motion to the reservoir 802 so that the reservoir 802 moves back and forth along the central axis R. In another embodiment, a motion generator 812 may impart both a rotational motion and a linear motion to the reservoir 802. In other exemplary embodiments, the motion generator 812 may impart other types of motions to the reservoir 802, e.g., irregular motions, complex motion patterns, linear motion along different axes, rotational motion about different axes, motion that changes between linear and rotational, etc.

The reservoir 802 may be coupled to the motion generators 812 using one or more mechanical coupling members, e.g., a rod, piston, etc., that reliably and efficiently transfer the motion generated by the generator to the reservoir 802.

The motion generator 808 and/or 812 may be coupled to an electrical power source (not shown), e.g., electrical mains or one or more batteries, that supplies electrical power to power the generator.

In operation, as the motion generator 812 moves the reservoir 802 in a rotational manner or back and forth in a linear manner, the inertia of the material solution in the reservoir 802 resists the motion of the motion generator 812 and the reservoir 802. This causes the material solution to be pulled against one or more walls of the reservoir 802 and to be ejected or extruded through one or more orifices 804 that are present on the walls. The material solution forms one or more jets as it is pulled through the orifices 804. The jets exit the reservoir 802 through the orifices 804 and enters the air gap 810 which permits high extensional shear of the polymer exiting the orifice prior to contacting the liquid in the collection device 806. The subsequent interaction of the material elongated in the air gap 810 with the liquid causes formation and solidification of the micron, submicron or nanometer dimension polymeric fibers. In some cases, the interaction of the material jets with the liquid causes precipitation and/or on-contact cross-linking of the polymeric fibers.

In an alternative embodiment, the reservoir 802 may be pressurized to eject the polymer material from the reservoir through the one or more orifices 804. For example, a mechanical pressurizer may be applied to one or more surfaces of the reservoir to decrease the volume of the reservoir, and thereby eject the material from the reservoir. In another exemplary embodiment, a fluid pressure may be introduced into the reservoir to pressurize the internal volume of the reservoir, and thereby eject the material from the reservoir.

In exemplary embodiments that employ motion, the velocity of the reservoir 802, linear or rotational, may be kept substantially constant during a fiber formation session or may be increased or decreased during a fiber formation session. Rotational speeds of the reservoir 802 in exemplary embodiments may range from about 1,000 rpm-400,000 rpm, for example, about 1,000 rpm to about 40,000 rpm, about 1,000 rpm to about 20,000 rpm, about 3,000 rpm-85,000 rpm, about 3,000 rpm-50,000 rpm, about 3,000 rpm-25,000 rpm, about 5,000 rpm-20,000 rpm, about 5,000 rpm to about 15,000 rpm, or about 50,000 rpm to about 400,000 rpm, e.g., about 1,000, 1,500, 2,000, 2,500, 3,000, 3,500, 4,000, 4,500, 5,000, 5,500, 6,000, 6,500, 7,000, 7,500, 8,000, 8,500, 9,000, 9,500,10,000, 10,500, 11,000, 11,500, 12,000, 12,500, 13,000, 13,500, 14,000, 14,500, 15,000, 15,500, 16,000, 16,500, 17,000, 17,500, 18,000, 18,500, 19,000, 19,500, 20,000, 20,500, 21,000, 21,500, 22,000, 22,500, 23,000, 23,500, 24,000, 32,000, 50,000, 55,000, 60,000, 65,000, 70,000, 75,000, 80,000, 85,000, 90,000, 95,000, 100,000, 105,000, 110,000, 115,000, 120,000, 125,000, 130,000, 135,000, 140,000, 145,000, 150,000 rpm, about 200,000 rpm, 250,000 rpm, 300,000 rpm, 350,000 rpm, or 400,000 rpm. Ranges and values intermediate to the above recited ranges and values are also contemplated to be part of the invention.

In certain embodiments, rotating speeds of about 50,000 rpm-100,000 rpm or about 50,000 rpm-400,000 rpm are intended to be encompassed by the methods of the invention. In one embodiment, devices employing rotational motion may be rotated at a speed greater than about 50,000 rpm, greater than about 55,000 rpm, greater than about 60,000 rpm, greater than about 65,000 rpm, greater than about 70,000 rpm, greater than about 75,000 rpm, greater than about 80,000 rpm, greater than about 85,000 rpm, greater than about 90,000 rpm, greater than about 95,000 rpm, greater than about 100,000 rpm, greater than about 105,000 rpm, greater than about 110,000 rpm, greater than about 115,000 rpm, greater than about 120,000 rpm, greater than about 125,000 rpm, greater than about 130,000 rpm, greater than about 135,000 rpm, greater than about 140,000 rpm, greater than about 145,000 rpm, greater than about 150,000 rpm, greater than about 160,000 rpm, greater than about 165,000 rpm, greater than about 170,000 rpm, greater than about 175,000 rpm, greater than about 180,000 rpm, greater than about 185,000 rpm, greater than about 190,000 rpm, greater than about 195,000 rpm, greater than about 200,000 rpm, greater than about 250,000 rpm, greater than about 300,000 rpm, greater than about 350,000 rpm, or greater than about 400,000 rpm.

Exemplary devices employing rotational motion may be rotated for any desired period of time, such as a time sufficient to form a desired length of polymeric fiber or desired collection of polymeric fibers (e.g., a sheet of polymeric fibers having a desired size and shape and which are held together by fiber-to-fiber interactions), such as, for example, about 1 minute to about 100 minutes, about 1 minute to about 60 minutes, about 10 minutes to about 60 minutes, about 30 minutes to about 60 minutes, about 1 minute to about 30 minutes, about 20 minutes to about 50 minutes, about 5 minutes to about 20 minutes, about 5 minutes to about 30 minutes, or about 15 minutes to about 30 minutes, about 5-100 minutes, about 10-100 minutes, about 20-100 minutes, about 30-100 minutes, or about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 minutes, or more. Times and ranges intermediate to the above-recited values are also intended to be part of this invention.

In embodiments that employ linear motion, linear speeds of the reservoir 802 may range from about 0.0001 m/s to about 4.2 m/s, but are not limited to this exemplary range. Comparing some exemplary devices that employ purely linear motion to some exemplary devices that employ purely rotational motion for fiber formation, a linear velocity of about 10.8 m/s corresponds to about 8,000 rpm of rotational velocity, a linear velocity of about 16.2 m/s corresponds to about 12,000 rpm of rotational velocity, and a linear velocity of about 27.1 m/s corresponds to about 20,000 rpm of rotational velocity.

An exemplary reservoir 802 may have any suitable volume, such as, for example, a volume ranging from about one nanoliter to about 1 milliliter, about one nanoliter to about 5 milliliters, about 1 nanoliter to about 100 milliliters, or about one microliter to about 100 milliliters, for holding the liquid material. Some exemplary volumes include, but are not limited to, about one nanoliter o about 1 milliliter, about one nanoliter to about 5 milliliters, about 1 nanoliter to about 100 milliliters, one microliter to about 100 microliters, about 1 milliliter to about 20 milliliters, about 20 milliliters to about 40 milliliters, about 40 milliliters to about 60 milliliters, about 60 milliliters to about 80 milliliters, about 80 milliliters to about 100 milliliters, but are not limited to these exemplary ranges. Exemplary volumes intermediate to the recited volumes are also part of the invention. In certain embodiment, the volume of the reservoir is less than about 5, less than about 4, less than about 3, less than about 2, or less than about 1 milliliter. In other embodiments, the physical size of an unfolded polymer and the desired number of polymers that will form a fiber dictate the smallest volume of the reservoir.

In some embodiments, the reservoir 802 may include one or more inlet ports, each coupled to one or more inlet pipes for introducing one or more material solutions and/or one or more other fluids (e.g., air pressure) into the reservoir 802. An exemplary inlet pipe may be coupled to one or more storage devices that store a material solution or to one or more devices that produce a material solution. One or more material solutions may be fed into the reservoir 802 through the inlet port at a constant flow rate or at variable flow rates. In an exemplary embodiment, the inlet port may be closed temporarily or permanently after the reservoir 802 is filled before fiber formation. In another exemplary embodiment, the inlet port may remain open for continuous or intermittent filling of the reservoir 802 during fiber formation. In an exemplary embodiment, the reservoir 802 may be pre-filled and the filled reservoir 802 may not include the inlet pipe and may have one or more temporarily or permanently sealed inlet ports. In another exemplary embodiment, the inlet port may remain coupled to the inlet pipe and the reservoir 802 may be filled continuously or in one or more sessions during fiber formation.

Exemplary orifices 804 may have any suitable cross-sectional geometry including, but not limited to, circular (as illustrated in the exemplary embodiments of FIGS. 1 and 8), oval, square, rectangular, etc. In an exemplary embodiment, one or more nozzles may be provided associated with an exemplary orifice 804 to provide control over one or more characteristics of the material solution exiting the reservoir 802 through the orifice including, but not limited to, the flow rate, speed, direction, mass, shape and/or pressure of the material solution. The locations, cross-sectional geometries and arrangements of the orifices 804 on the reservoir 802, and/or the locations, cross-sectional geometries and arrangements of the nozzles on the orifices 804, may be configured based on the desired characteristics of the resulting fibers and/or based on one or more other factors including, but not limited to, viscosity of the material solution, the rate of solvent evaporation during fiber formation, etc.

Exemplary orifice lengths that may be used in some exemplary embodiments range between about 0.001 m and about 0.1 m, between about 0.001 m and about 0.01 m, between about 0.001 m and about 0.005 m, between about 0.002 m and about 0.005 m, between about 0.001 m and about 0.05 m, between about 0.0015 m and about 0.007 m, between about 0.002 m and about 0.007 m, between about 0.0025 m and about 0.0065 m, between about 0.002 m and about 0.006 m, e.g., about 0.0015, 0.002, 0.0025, 0.003, 0.0035, 0.004, 0.0045, 0.005, 0.0055, 0.006, 0.0065, 0.007, 0.0075, 0.008, 0.0085, 0.009, 0.0095, 0.01, 0.015, 0.02, 0.025, 0.03, 0.035, 0.04, 0.045, 0.05, 0.055, 0.06, 0.065, 0.07, 0.075, 0.08, 0.085, 0.09, 0.095, or 0.1 m. Ranges and values intermediate to the above recited ranges and values are also contemplated to be part of the invention.

Exemplary orifice diameters that may be used in some exemplary embodiments range between about 0.05 µm and about 1000 µm, e.g., between about 0.05 and about 500, between about 0.05 and 100, between about 0.1 and 1000, between about 0.1 and 500, between about 0.1 and 100, between about 1 and 1000, between about 1 and 500, between about 1 and 100, between about 10 and 1000, between about 10 and 500, between about 10 and 100, between about 50 and 1000, between about 50 and 500, between about 50 and 100, between about 100 and 1000, between about 100 and 500, between about 150 and 500, between about 200 and 500, between about 250 and 500, between about 250 and 450, 0.05, 0.06, 0.07, 0.08, 0.09, 0.1, 0.15, 0.2, 0.225, 0.25, 0.275, 0.3, 0.325, 0.35, 0.375, 0.4, 0.425, 0.45, 0.475, 0.5, 0.525, 0.55, 0.575, 0.6, 0.625, 0.65, 0.675, 0.7, 0.725, 0.75, 0.075, 0.8, 0.825, 0.85, 0.825, 0.9, 0.925, 0.95, 0.975, 1.0, 1.5, 2, 2.5, 3, 3.5, 4, 4.5, 5, 5.5, 6, 6.5, 7, 7.5, 8, 8.5, 9, 9.5, 10, 20, 30, 40, 50, 60, 70, 80, 90, 100, 150, 200, 250, 300, 350, 400, 450, 500, 550, 600, 650, 700, 750, 800, 850, 900, 950, or 1000 µm. Ranges and values intermediate to the above recited ranges and values are also contemplated to be part of the invention.

The reservoir and collection device may be constructed of any material, e.g., a material that can withstand heat and/or that is not sensitive to chemical organic solvents. In one embodiment, the reservoir and the collection device are made up of a plastic material, e.g., polypropylene, polyethylene, or polytetrafluoroethylene. In another embodiment, the reservoir and the collection device are made up of a metal, e.g., aluminum, steel, stainless steel, tungsten carbide, tungsten alloys, titanium or nickel. In one embodiment, the collection device is constructed of inert plastic having a melting temperature greater than 200° C. In another embodiment, the collection device is constructed of glass.

Any suitable size or geometrically shaped reservoir or collector may be used in the devices of the invention. For example, the reservoir and/or collector may be round, rectangular, or oval. The reservoir and/or collector may be round, oval, rectangular, or a half-heart shape. The collector may also be shaped in the form of any living organ, such as a heart, kidney, liver lobe(s), bladder, uterus, intestine, skeletal muscle, or lung shape, or portion thereof, or, for the fabrication of protective clothing, a human head, a torso, a hand, etc. The collector may further be shaped as any hollow cavity, organ or tissue, such as a circular muscle structure, e.g., a sphincter or iris. These shapes allow the polymeric fibers to be deposited in the form of a living organ for the production of engineered tissue and organs, described in more detail below. In other embodiments, the collection device is a drum or cylinder, such as a rotating drum or cylinder immersed in a liquid.

In one embodiment, the devices of the invention further comprise a component suitable for continuously feeding the polymer into the rotating reservoir, such as a spout or syringe pump The reservoir may also include a heating element for heating and/or melting the polymer.

In certain embodiments, the collection device is maintained at about room temperature, e.g., about 20, 21, 22, 23, 24, 25, 26, 27, 28, 29, or about 30° C. and ambient humidity, e.g., about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or about 90% humidity. The devices may be maintained at and the methods may be formed at any suitable temperature and humidity.

The collection device is suitably sized and may contain about 100, 150, 200, 250, 300, 350, 400, 450, 500, 600, 650, 700, 740, 800, 850, 900, 950, 1,000, 1,100, 1,200, 1,300, 1,400, 1,500, 1,600, 1,700, 1,800, 1,900, 2,000, 2,100, 2,200, 2,300, 2,400, 2,500, 2,600, 2,700, 2,800, 2,900, 2,000, 3,00, 3,100, 3,200, 3,300, 3,400, 3,500, 3,600, 3,700, 3,800, 3,900, or about 4,000 mls or more of liquid. Values intermediate to the above recited values are also contemplated to be part of the invention.

In one embodiment of the invention, the device is free of a needle.

In one embodiment, the formed micron, submicron or nanometer dimension polymeric fiber is imaged, e.g., using a scanning electron microscope.

Exemplary fiber formation devices may employ one or more mechanisms to control the force and/or speed with which the material jet leaves the reservoir through one or more orifices. In an exemplary embodiment, the speed (linear and/or rotational) and/or magnitude of the motion (e.g., the distance traveled by the motion generator along a linear axis) of the motion generator may be increased to increase the pressure of the material solution in the reservoir which, in turn, increases the force and/or the speed with which the jets leave the reservoir, and vice versa. In an exemplary embodiment, the material solution may be fed into the reservoir through an inlet port during fiber formation to increase the pressure of the material solution in the reservoir which, in turn, increases the force and/or the speed with which the jets leave the reservoir, and vice versa. In an exemplary embodiment, the material solution may be fed into the reservoir through the inlet port at a faster or a slower rate to increase or decrease, respectively, the pressure of the material solution in the reservoir. This, in turn, raises or lowers, respectively, the force and/or the speed with which the jets leave the reservoir.

Exemplary fiber formation devices may employ the controllable linear motion of the reservoir to control alignment of the resulting fibers. Controlling one or more aspects of the linear motion of an exemplary reservoir enables control over the deposition and alignment of each layer of polymeric fibers onto the collection device. Exemplary aspects of the linear motion that may be controlled in exemplary devices include, but are not limited to, the speed of the linear motion of the reservoir, the force and/or speed with which the material jet leaves the reservoir, the dimensions of the reservoir, etc.

In some exemplary embodiments, the speed with which an exemplary motion generator oscillates the reservoir and/or the collection device affects the pitch of the helical fibers and the spacing between the fibers. An increasing vertical speed of the reservoir and/or the collection device typically results in an increased pitch of the helical fibers. Accordingly, in an exemplary embodiment, the pitch of the fibers formed is increased by increasing the linear speed of the oscillating reservoir and/or the oscillating collection device along the vertical direction, and vice versa. An increasing vertical speed of the reservoir and/or the collection device typically results in an increased spacing between the fibers. Accordingly, in an exemplary embodiment, the fiber spacing formed is increased by increasing the linear speed of the oscillating reservoir and/or the oscillating collection device along the vertical direction, and vice versa.

In some exemplary embodiments, the polymeric fiber configuration formed on the collection device in exemplary devices of the invention, e.g., a mat configuration, a mesh configuration, etc., may be controlled by controlling aspects of the linear motion of the reservoir and/or the collection device. In some exemplary embodiments, the pore sizes formed between fibers of a mesh configuration, e.g., larger or smaller pore sizes, may be controlled by controlling aspects of the linear motion of the reservoir and/or the collection device in exemplary devices. An increasing vertical speed of the reservoir and/or collection device typically results in larger pore sizes of the fibers, and vice versa. Accordingly, in an exemplary embodiment, the pore sizes of a polymeric fiber mesh structure formed is increased by increasing the linear speed of the oscillating reservoir and/or oscillating collection device along the vertical direction, and vice versa. Thus, exemplary devices may be used to form fibers of different porosities, e.g., for filters with varying pore sizes, for a cell-scaffold with a desired pore size which may be used to select a desired cell-scaffold infiltration, etc.

In an exemplary embodiment, as the reservoir and/or collection device is oscillated in a linear manner while the reservoir is being rotated, the fibers are deposited in a controlled mesh structure, wherein the linear velocity of the reservoir and/or collection device determines the mesh pore size and the pitch of the polymeric fiber mesh structure. The pore size depends on the fiber diameter as well as the fiber pitch. A maximum pore size typically results from large fibers and an approximately 45 degree pitch in one direction. In this exemplary embodiment, fibers exiting the orifices of the reservoir at an approximately 45 degree angle in one direction are deposited in an approximately −45 degree angle in the other direction due to the linear motion. This results in the formation of layers of fibers that overlap each other at approximately 90 degrees.

Figure 2:
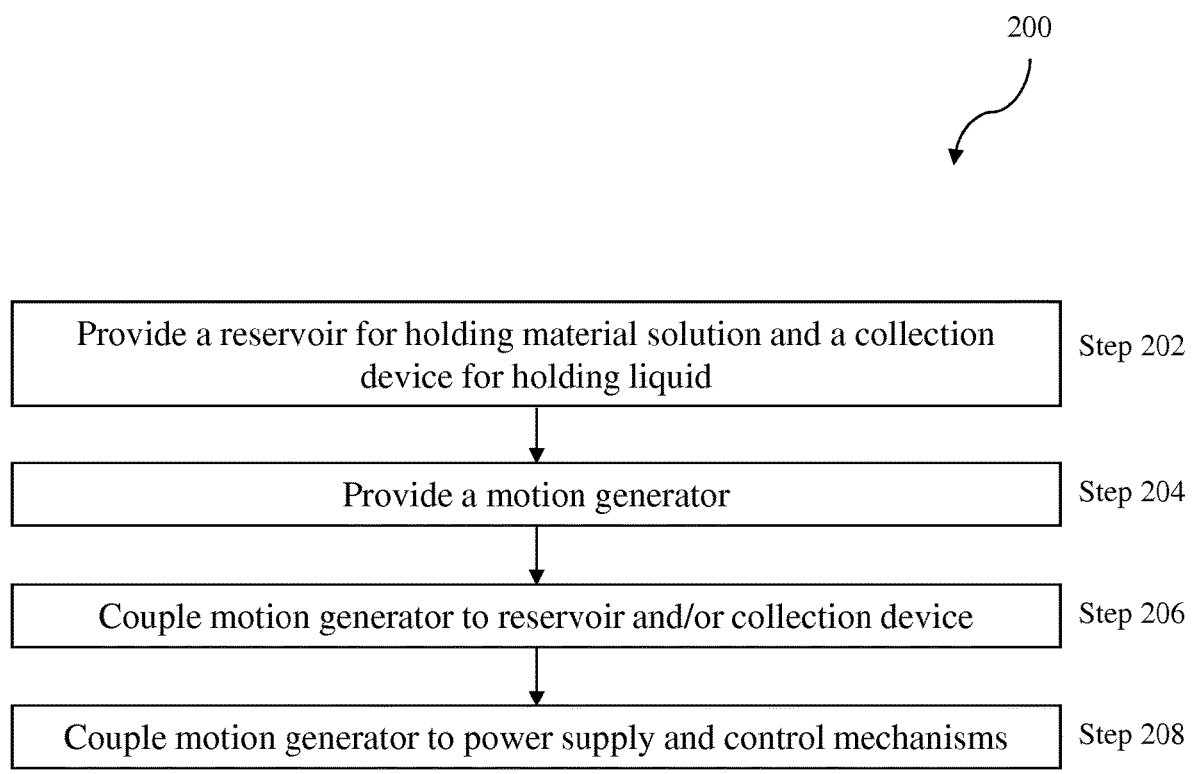
FIG. 2 is a flowchart illustrating an exemplary method for providing an exemplary fiber formation device.

FIG. 2 is a flowchart illustrating an exemplary method 200 for forming or manufacturing an exemplary fiber formation device. In step 202, one or more reservoirs are provided for holding a material solution. One or more collection devices for holding a liquid are provided for collecting polymeric fibers.

In step 204, one or more motion generators are provided for moving the reservoir and/or collection device for fiber formation. In step 206, the reservoir and/or the collection device are coupled to the motion generators. In an exemplary embodiment, the motion generators may be directly coupled to the reservoir and/or the collection device. For example, one or more motors may be provided on or integrally with the reservoir and/or the collection device. In other exemplary embodiments, the motion generators may be coupled to the reservoir and/or the collection device indirectly using one or more mechanical members, e.g., rods.

In step 208, one or more power sources and/or motion generator control mechanisms are provided integrally with the reservoir and/or the collection device, or separately from the reservoir and/or the collection device. The power sources, e.g., one or more batteries, provide electrical energy to the motion generators. The motion generator control mechanisms, e.g., one or more signal generators, control the movement of the motion generators, e.g., activation of the motion generators, the speed of the motion generators, the magnitude of the motion of the motion generators, etc. The motion generator control mechanisms may be used to pre-program the motion of the motion generators. The motion generator control mechanisms may be used to start, stop and alter the motion of the motion generators for a fiber formation session.

Figure 3:
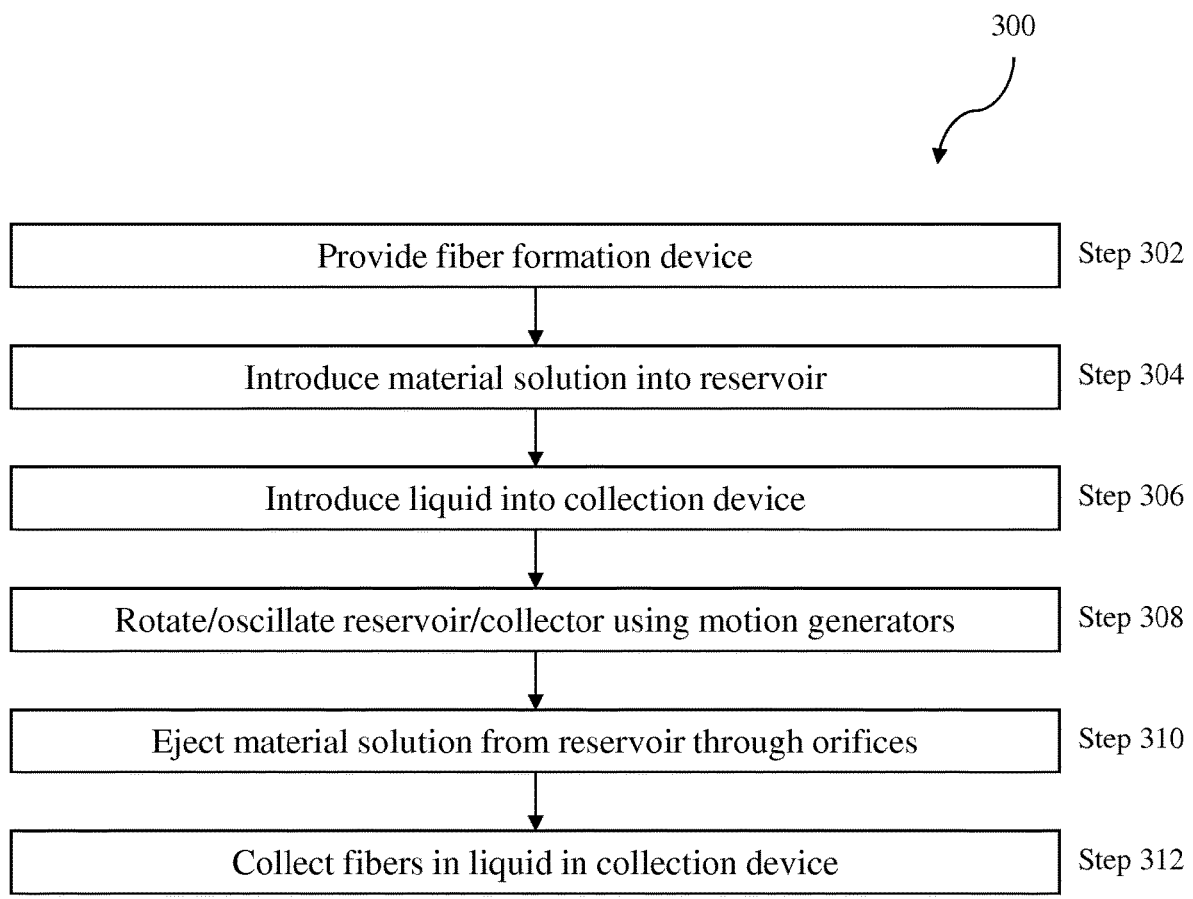
FIG. 3 is a flowchart illustrating an exemplary method for using an exemplary fiber formation device.
Figure 4:
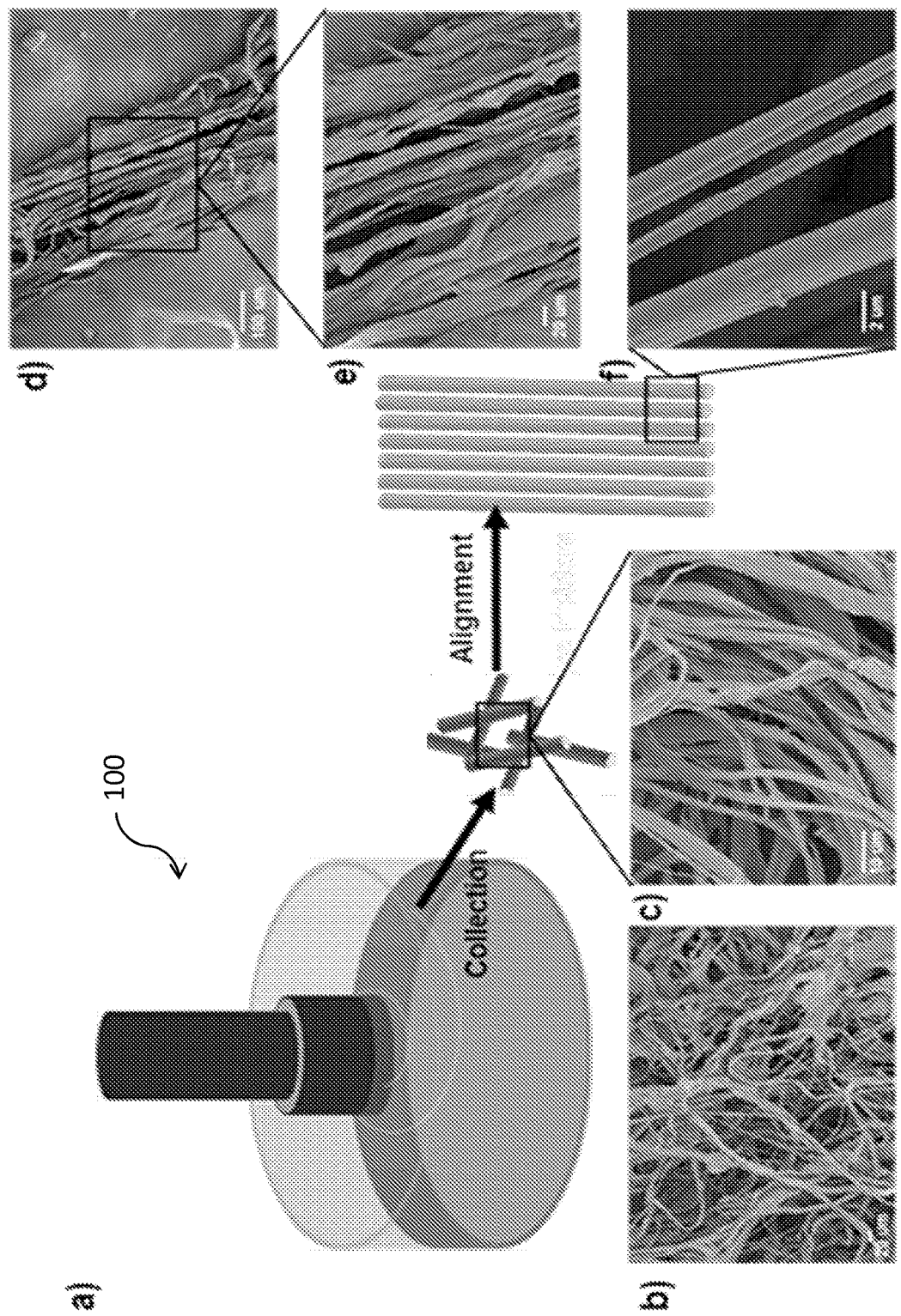
FIGS. 4A-4F illustrate isotropic and anisotropic deoxyribonucleic acid fibers fabricated using exemplary fiber formation devices and methods. A 5% DNA solution was prepared in a 30% ethanol solution, rotated at 16,000 rpm into a 95% ethanol solution within the collection device.

FIG. 3 is a flowchart illustrating an exemplary method 300 for using an exemplary fiber formation device to form fibers from a material solution. In step 302, an exemplary fiber formation device is provided, for example, in accordance with method 200 illustrated in FIG. 2. In step 304, the material solution is introduced into the reservoir, for example, through one or more inlet ports of the reservoir. The material solution may be introduced into the reservoir at one time, two or more times, continuously or periodically. The volume and flow rate of the material solution introduced into the reservoir may be kept constant or altered based on the requirements of fiber formation. In step 306, a liquid is introduced into the collection device for received material jets ejected from the reservoir.

In step 308, the reservoir and/or collection device are moved using one or more motion generators in a rotational and/or linear manner. In step 310, the material solution is ejected from the reservoir through one or more orifices in the reservoir. In step 312, the ejected fibers are received in the liquid held in the one or more collection devices, which causes formation and solidification of the fibers. In some embodiments, the material solution is ejected from the reservoir through one or more orifices in the reservoir is initially ejected through an air gap generated by a liquid vortex in the liquid in the collection device and subsequently received in the liquid held in the one or more collection devices which cause formation and solidification of the fibers.

In some embodiments, the fibers may be collected from the collection device using any suitable technique. One collection technique involves manually extracting the fibers from the liquid in the collection device. Another collection technique involves the use of a spinning around a mandrill to wind the fibers and remove them from the liquid. Yet another collection techniques involves emptying the liquid which includes the fibers onto a filter and, e.g., applying a vacuum to, e.g., remove excess water from the fibers (e.g., DNA fibers). In some embodiments, the collected fibers may be mechanically manipulated to adjust the alignment of the fibers and to achieve a desired orientation of the fibers, e.g., by applying uniaxial tension, biaxial tension, and/or shear, and/or by spinning the fibers onto a mandrill.

B. Exemplary Orifices and Nozzles

In exemplary fiber formation devices, an exemplary reservoir includes one or more orifices through which a material solution may be ejected from the reservoir during fiber formation. The devices include a sufficient number of orifices for ejecting the polymer during operation, such as 1, 2, 3, 4, 5, 6, 7, 8, 9, 10, 11, 12, 13, 14, 15, or more orifices. The orifices may be provided on any surface or wall of the reservoir, e.g., side walls, top walls, bottom walls, etc. In exemplary embodiments in which multiple orifices are provided, the orifices may be grouped together in close proximity to one another, e.g., on the same surface of the reservoir, or may be spaced apart from one another, e.g., on different surfaces of the reservoir.

The orifices may be of the same diameter or of different diameters, e.g., diameters of about 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1.0, 2, 3, 4, 5, 6, 7, 8, 9, 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, or about 1000 micrometers. Diameters intermediate to the above-recited values are also intended to be part of this invention.

The length of the one or more orifices may be the same or different, e.g., diameters of about 0.0015, 0.002, 0.0025, 0.003, 0.0035, 0.004, 0.0045, 0.005, 0.0055, 0.006, 0.0065, 0.007, 0.0075, 0.008, 0.0085, 0.009, 0.0095, 0.01, 0.015, 0.02, 0.025, 0.03, 0.035, 0.04, 0.045, 0.05, 0.055, 0.06, 0.065, 0.07, 0.075, 0.08, 0.085, 0.09, 0.095, or 0.1 m. Lengths intermediate to the above recited lengths are also contemplated to be part of the invention.

In exemplary fiber formation devices, one or more nozzles may be provided associated with one or more orifices of a reservoir through which a material solution is ejected from the reservoir. An exemplary nozzle may include a body portion that projects from a side-wall of a reservoir substantially orthogonally to the side-wall, and an orifice at a terminal end of the body portion that is exposed to the external environment. A polymer material provided in the reservoir may flow out of the reservoir, through the body portion of the nozzle and out of the nozzle through the orifice of the nozzle in order to form a fiber.

In some exemplary embodiments, exemplary nozzles may be fabricated separately from a reservoir and may be patched onto the reservoir. In other exemplary embodiments, exemplary nozzles may be formed integrally with a reservoir. In some exemplary embodiments, exemplary nozzles may be formed of silicon and aluminum using photolithography and Deep Reactive Ion etching (DRIE). In some exemplary embodiments, exemplary nozzles may be formed using Focused Ion Beam (FIB) or E-Beam lithography techniques. In another exemplary embodiment, exemplary nozzles are provided replaceably on orifices so that one nozzle provided on an orifice may be replaced by another nozzle. In these exemplary embodiments, the same orifice and the same reservoir may be used to form polymeric fibers with different surface topographies.

Exemplary nozzles may have cross-sectional configurations and shapes that impart the configurations to the outer surface of polymeric fibers formed by exemplary fiber formation devices, which increases the surface area of the polymeric fibers and the complexity of the surface topographies of the polymeric fibers. Exemplary nozzles convolute the surface of the polymeric fibers and create small structures on the surface including, but not limited to, projections, ridges, craters, spirals, etc. The fibers formed by exemplary nozzles retain the surface topographies and convolutions imparted by the nozzles. Exemplary polymeric fibers may range in diameter from about 1 nanometer to about 100 microns, and exemplary structures may range in size from about 1 nanometer to about 500 nanometers. Exemplary polymeric fibers may have any number of such structures on the outer surface including, but not limited to, from one to hundreds or thousands.

An exemplary nozzle is provided integrally or removably on a reservoir so that the nozzle is associated with a single orifice. In another exemplary embodiment, exemplary nozzles are provided replaceably on orifices so that one nozzle provided on an orifice may be replaced by another nozzle. In these exemplary embodiments, the same orifice and the same reservoir may be used to form polymeric fibers with different surface topographies.

The convolution of the surface and the structures on the surface of the polymeric fibers impart unique properties to the fibers. In an exemplary embodiment, a polymeric fiber with hundreds or thousands of structural projections on its surface formed using exemplary nozzles has a hydrophobic property, i.e., the polymeric fibers act similar to a lotus leaf in nature to repel water. In an exemplary embodiment, polymeric fibers with high surface areas formed using exemplary nozzles may be used for different applications including, but not limited to, photovoltaic cells, controlled drug delivery, etc. Exemplary polymeric fibers with high surface areas formed using exemplary nozzles may be used to increase the tensile strength of already strong fibers, e.g., poly-paraphenylene terephthalamide, carbon fiber, etc.

An exemplary star shape may have any desired number of points including, but not limited to, three to about a thousand points. Exemplary star point lengths (i.e., the length from the center of a star-shaped nozzle to a point of the start shape) may range from about 0.5 microns to about 1 mm (e.g., about 1, 2, 3, 4, 5, 6, 7, 8, 9, 10, 50, 100, 150, 200, 250, 300, 350, 400, 450, 500, 600, 650, 700, 750, 800, 850, 900, 950, or 1000 microns) in some exemplary embodiments. Lengths intermediate to the above recited lengths are also contemplated to be part of the invention.

In other exemplary embodiments, the cross-sectional shapes of exemplary nozzles may include asymmetric features to encourage polymeric fibers spiraling as the material solution exits through the nozzles. The spiraling may be used to form complex polymeric fiber surface textures. In some exemplary embodiments, the cross-sectional shapes of exemplary nozzles may have more complex features than those illustrated including, but not limited to, one or more circular ribbons, one or more circular wavy ribbons, one or more oval ribbons, one or more oval way ribbons, one or more rectangular ribbons, one or more rectangular way ribbons, one or more polygonal ribbons, one or more polygonal wavy ribbons, one or more multi-point stars (e.g., one or more stars, each having a number of points that ranges from four to hundreds), one or more slits, one or more crosses, etc.

In some exemplary embodiments, an exemplary nozzle may have one or more discrete openings having the same configuration or different configurations. In some exemplary embodiments, the cross-sectional shapes of exemplary nozzles may include asymmetric features to encourage polymeric fibers spiraling as the material solution exits through the nozzles. The spiraling may be used to form complex polymeric fiber surface textures. In some exemplary embodiments, the cross-sectional shapes of exemplary nozzles may have more complex features than those illustrated including, but not limited to, one or more circular ribbons, one or more circular wavy ribbons, one or more oval ribbons, one or more oval way ribbons, one or more rectangular ribbons, one or more rectangular way ribbons, one or more polygonal ribbons, one or more polygonal wavy ribbons, one or more multi-point stars (e.g., one or more stars, each having a number of points that ranges from four to hundreds), one or more slits, one or more crosses, etc.

C. Use of Exemplary Embodiments in Configuring Fiber Surface Texture and Porosity Exemplary embodiments may be used to create fibers which have a desired surface texture, e.g., rough, smooth, etc. Exemplary embodiments may also be used to create fibers and/or multi-fiber structures (e.g., meshes, mats, etc.) having a desired porosity, i.e., having a desired pore size.

Fiber surface texture and porosity is a function of different factors including, but not limited to, the rotational and/or linear speed of the reservoir and the mechanical characteristics of the material solution.

In an exemplary embodiment, exemplary fiber formation devices configure the rotational and/or linear speed of the reservoir to configure the porosity of the fibers. For example, the speed of the reservoir may be increased to increase the porosity, and vice versa.

In an exemplary embodiment, exemplary fiber formation devices configure the rotational and/or linear speed of the reservoir to configure the surface texture of the fibers.

In an exemplary embodiment, the type of material in the material solution may be altered to configure the surface texture and porosity of the fibers.

In certain embodiments, the fibers may be formed in an environment at exemplary temperatures including, but not limited to, about 20, 21, 22, 23, 24, 25, 26, 27, 28, 29, or about 30° C.

In an exemplary embodiment, the nozzles of the reservoir may be configured to increase the jet surface area of the material solution.

In other exemplary embodiments, one or more of the above factors may be altered in combination to affect the surface texture and porosity of the fibers.

D. Exemplary Polymers

Suitable polymers for use in exemplary devices and methods include water soluble polymers (i.e., polymers dissolved in slowly evaporating solvents, e.g., aqueous solvents), polymers that require on-contact cross-linking (e.g., alginate) and/or polymers that cannot be readily dissolved at a high enough concentrations to provide sufficient viscosity for random entanglement and solvent evaporation to form polymeric fibers (e.g., deoxyribonucleic acid, polyurethane-polyurea copolymer, and polyacrylonitrile), and/or polymers that require precipitation (e.g., deoxyribonucleic acid) and/or polymers dissolved in water at low concentrations (e.g., below 2%), and/or polymers that require both extension in air and precipitation (e.g., polyamides, e.g., liquid crystalline polymers, e.g., poly-paraphenylene terephthalamide, and poly(p-phenylene benzobisoxazole)).

Suitable polymers may be biocompatible or non-biocompatible, synthetic or natural, e.g., biogenic polymers, e.g., proteins, polysaccharides, lipids, nucleic acids or combinations thereof.

Exemplary polymers which require on-contact crosslinking include, for example, alginate, gelatin, collagen, chitosan, polyvinyl alcohols, polyacrylamides, starches, and polyethylene oxides, copolymers and derivatives thereof Exemplary polymers which require precipitation include, for example, deoxyribonucleic acid, ribonucleic acid, polyurethane-polyurea copolymer, and polyacrylonitrile.

Exemplary polymers which require extension in air and precipitation include, for example, polyamides, e.g., liquid crystalline polymers, e.g., poly-paraphenylene terephthalamide, e.g., 1,4-phenylene-diamine (para-phenylenediamine) and terephthaloyl chloride, and poly(p-phenylene benzobisoxazole)). In one embodiment, the polymer is poly-paraphenylene terephthalamide.

In certain embodiments of the invention, the methods include mixing a biologically active agent, e.g., a polypeptide, protein, nucleic acid molecule, nucleotide, lipid, biocide, antimicrobial, or pharmaceutically active agent, with the polymer during the fabrication process of the polymeric fibers. For example, polymeric fibers prepared using the devices and methods of the invention may be contacted with encapsulated fluorescent polystyrene beads.

In other embodiments, a plurality of living cells is mixed with the polymer during the fabrication process of the polymeric fibers. In such embodiments, biocompatible polymers (e.g., hydrogels) may be used.

Sufficient speeds and times for operating the devices of the invention to form a polymeric fiber are dependent on the concentration of the polymer and the desired features of the formed polymeric fiber.

In one embodiment, the polymer is not sugar, e.g., raw sugar, or sucrose. In another embodiment, the polymer is not floss sugar.

In one embodiment, a polymer for use in the methods of the invention is a synthetic polymer.

In another embodiment, polymers for use in the polymeric fibers of the invention are not biocompatible.

In yet another embodiment, polymers for use in the polymeric fibers of the invention are naturally occurring polymers, e.g., biogenic polymers. Non-limiting examples of such naturally occurring polymers include, for example, polypeptides, proteins, e.g., capable of fibrillogenesis, polysaccharides, e.g., alginate, lipids, nucleic acid molecules, and combinations thereof.

In one embodiment, a single polymer is used to fabricate the polymeric fibers of the invention. In another embodiment, two, three, four, five, or more polymers are used to fabricate the polymeric fibers of the invention. In one embodiment the polymers for use in the methods of the invention may be mixtures of two or more polymers and/or two or more copolymers. In one embodiment the polymers for use in the methods of the invention may be a mixture of one or more polymers and or more copolymers. In another embodiment, the polymers for use in the methods of the invention may be a mixture of one or more synthetic polymers and one or more naturally occurring polymers.

A polymer for use in the methods of the invention may be fed into the reservoir as a polymer solution. Accordingly, the methods of the invention may further comprise dissolving the polymer in a solvent (e.g., a non-volatile solution, e.g., an aqueous solution, such as water, 30% ethanol) prior to feeding the polymer into the reservoir.

In one embodiment, as the polymer is poly-paraphenylene terephthalamide and the methods further comprise dissolving the polymer in sulfuric acid to a concentration of about 1, 2, 3, 4, 5, 6, 7, 8, 9, 10, 11, 12, 13, 14, 15, 16, 17, 18, 19 or about 20% weight/volume) at a temperature of, about 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89 or about 90° C.), prior to feeding the solution into the reservoir.

Alternatively, the polymer may be fed into the reservoir as a polymer melt and, thus, in one embodiment, the reservoir is heated at a temperature suitable for melting the polymer, e.g., heated at a temperature of about 100° C.-300° C., 100° C.-200° C., about 150-300° C., about 150-250° C., or about 150-200° C., 200° C.-250° C., 225° C.-275° C., 220° C.-250° C., or about 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, or about 300° C. Ranges and temperatures intermediate to the recited temperature ranges are also part of the invention. In such embodiments, the reservoir may further comprise a heating element.

In one embodiment, the polymeric fibers formed according to the methods of the invention are further contacted with an agent to produce or increase the size of pores or number of pores per surface unit area in the polymeric fibers.

The polymeric fibers formed according to the methods of the invention may be contacted with additional agents and optionally cultured in an appropriate medium, such as a tissue culture medium. Contacting the polymeric fibers with the additional agents will allow the agents to, for example, coat (fully or partially) the fibers, or in the case of for example cells, to intercalate between fibers. Contacting the polymer with additional agents during the fabrication of the polymeric fibers also allows the agents to be incorporated into the polymeric fibers themselves.

In one embodiment, a plurality of polymeric fibers may be contacted, e.g., seeded, with a plurality of living cells, e.g., vascular smooth muscle cells, myocytes (e.g., cardiac myocytes), skeletal muscle, myofibroblasts, airway smooth muscle cells, osteoblasts, myoblasts, neuroblasts, fibroblasts, glioblasts, germ cells, hepatocytes, chondrocytes, keratinocytes, connective tissue cells, glial cells, epithelial cells, endothelial cells, vascular endothelial cells, hormone-secreting cells, cells of the immune system, neural cells, and cells that will differentiate into contractile cells (e.g., stem cells, e.g., embryonic stem cells or adult stem cells, progenitor cells or satellite cells). In one embodiment, polymeric fibers treated with a plurality of living cells may be cultured in an appropriate medium in vitro. Such cultured cells exhibit characteristics and functions typical of such cells in vivo. The plurality of living cells may comprise one or more types of cells, such as described in U.S. Provisional Application No. 61/306,736 and PCT Application No. PCT/US09/060224, entitled "Tissue Engineered Mycocardium and Methods of Productions and Uses Thereof", filed Oct. 9, 2009, the entire contents of each of which are incorporated herein by reference.

The cells may be normal cells, abnormal cells (e.g., those derived from a diseased tissue, or those that are physically or genetically altered to achieve a abnormal or pathological phenotype or function), normal or diseased muscle cells derived from embryonic stem cells or induced pluripotent stem cells.

The term "progenitor cell" is used herein to refer to cells that have a cellular phenotype that is more primitive (e.g., is at an earlier step along a developmental pathway or progression than is a fully differentiated cell) relative to a cell which it can give rise to by differentiation. Often, progenitor cells also have significant or very high proliferative potential. Progenitor cells can give rise to multiple distinct differentiated cell types or to a single differentiated cell type, depending on the developmental pathway and on the environment in which the cells develop and differentiate.

The term "progenitor cell" is used herein synonymously with "stem cell."

The term "stem cell" as used herein, refers to an undifferentiated cell which is capable of proliferation and giving rise to more progenitor cells having the ability to generate a large number of mother cells that can in turn give rise to differentiated, or differentiable daughter cells. The daughter cells themselves can be induced to proliferate and produce progeny that subsequently differentiate into one or more mature cell types, while also retaining one or more cells with parental developmental potential. The term "stem cell" refers to a subset of progenitors that have the capacity or potential, under particular circumstances, to differentiate to a more specialized or differentiated phenotype, and which retains the capacity, under certain circumstances, to proliferate without substantially differentiating. In one embodiment, the term stem cell refers generally to a naturally occurring mother cell whose descendants (progeny) specialize, often in different directions, by differentiation, e.g., by acquiring completely individual characters, as occurs in progressive diversification of embryonic cells and tissues. Cellular differentiation is a complex process typically occurring through many cell divisions. A differentiated cell may derive from a multipotent cell which itself is derived from a multipotent cell, and so on. While each of these multipotent cells may be considered stem cells, the range of cell types each can give rise to may vary considerably. Some differentiated cells also have the capacity to give rise to cells of greater developmental potential. Such capacity may be natural or may be induced artificially upon treatment with various factors. In many biological instances, stem cells are also "multipotent" because they can produce progeny of more than one distinct cell type, but this is not required for "stem-ness." Self-renewal is the other classical part of the stem cell definition. In theory, self-renewal can occur by either of two major mechanisms. Stem cells may divide asymmetrically, with one daughter retaining the stem state and the other daughter expressing some distinct other specific function and phenotype. Alternatively, some of the stem cells in a population can divide symmetrically into two stems, thus maintaining some stem cells in the population as a whole, while other cells in the population give rise to differentiated progeny only. Formally, it is possible that cells that begin as stem cells might proceed toward a differentiated phenotype, but then "reverse" and re-express the stem cell phenotype, a term often referred to as "dedifferentiation" or "reprogramming" or "retrodifferentiation".

The term "embryonic stem cell" is used to refer to the pluripotent stem cells of the inner cell mass of the embryonic blastocyst (see U.S. Pat. Nos. 5,843,780, 6,200,806, the contents of which are incorporated herein by reference). Such cells can similarly be obtained from the inner cell mass of blastocysts derived from somatic cell nuclear transfer (see, for example, U.S. Pat. Nos. 5,945,577, 5,994,619, 6,235,970, which are incorporated herein by reference). The distinguishing characteristics of an embryonic stem cell define an embryonic stem cell phenotype. Accordingly, a cell has the phenotype of an embryonic stem cell if it possesses one or more of the unique characteristics of an embryonic stem cell such that that cell can be distinguished from other cells. Exemplary distinguishing embryonic stem cell characteristics include, without limitation, gene expression profile, proliferative capacity, differentiation capacity, karyotype, responsiveness to particular culture conditions, and the like.

The term "adult stem cell" or "ASC" is used to refer to any multipotent stem cell derived from non-embryonic tissue, including fetal, juvenile, and adult tissue. Stem cells have been isolated from a wide variety of adult tissues including blood, bone marrow, brain, olfactory epithelium, skin, pancreas, skeletal muscle, and cardiac muscle. Each of these stem cells can be characterized based on gene expression, factor responsiveness, and morphology in culture. Exemplary adult stem cells include neural stem cells, neural crest stem cells, mesenchymal stem cells, hematopoietic stem cells, and pancreatic stem cells.

In one embodiment, progenitor cells suitable for use in the claimed devices and methods are Committed Ventricular Progenitor (CVP) cells as described in PCT Application No. PCT/US09/060224, entitled "Tissue Engineered Myocardium and Methods of Productions and Uses Thereof", filed Oct. 9, 2009, the entire contents of which are incorporated herein by reference.

Cells for seeding can be cultured in vitro, derived from a natural source, genetically engineered, or produced by any other means. Any natural source of prokaryotic or eukaryotic cells may be used. Embodiments in which the polymeric fibers contacted with a plurality of living cells are implanted in an organism can use cells from the recipient, cells from a conspecific donor or a donor from a different species, or bacteria or microbial cells.

In one embodiment of the invention, a plurality of polymeric fibers is contacted with a plurality of muscle cells and cultured such that a living tissue is produced. In another embodiment of the invention, a plurality of polymeric fibers is contacted with a plurality of muscle cells and cultured such that a living tissue is produced, and the living tissue is further contacted with neurons, and cultured such that a living tissue with embedded neural networks is produced.

In one particular embodiment, the living tissue is an anisotropic tissue, e.g., a muscle thin film.

In other embodiments of the invention, a plurality of polymeric fibers is contacted with a biologically active polypeptide or protein, such as, collagen, fibrin, elastin, laminin, fibronectin, integrin, hyaluronic acid, chondroitin 4-sulfate, chondroitin 6-sulfate, dermatan sulfate, heparin sulfate, heparin, and keratan sulfate, and proteoglycans. In one embodiment, the polypeptide or protein is lipophilic.

In still other embodiments, the polymeric fibers are contacted with nucleic acid molecules and/or nucleotides, or lipids.

A plurality of polymeric fibers may also be contacted with a pharmaceutically active agent. Suitable pharmaceutically active agents include, for example, anesthetics, hypnotics, sedatives and sleep inducers, antipsychotics, antidepressants, antiallergics, antianginals, antiarthritics, antiasthmatics, antidiabetics, antidiarrheal drugs, anticonvulsants, antigout drugs, antihistamines, antipruritics, emetics, antiemetics, antispasmodics, appetite suppressants, neuroactive substances, neurotransmitter agonists, antagonists, receptor blockers and reuptake modulators, beta-adrenergic blockers, calcium channel blockers, disulfiram and disulfiram-like drugs, muscle relaxants, analgesics, antipyretics, stimulants, anticholinesterase agents, parasympathomimetic agents, hormones, anticoagulants, antithrombotics, thrombolytics, immunoglobulins, immunosuppressants, hormone agonists/antagonists, vitamins, antimicrobial agents, antineoplastics, antacids, digestants, laxatives, cathartics, antiseptics, diuretics, disinfectants, fungicides, ectoparasiticides, antiparasitics, heavy metals, heavy metal antagonists, chelating agents, gases and vapors, alkaloids, salts, ions, autacoids, digitalis, cardiac glycosides, antiarrhythmics, antihypertensives, vasodilators, vasoconstrictors, antimuscarinics, ganglionic stimulating agents, ganglionic blocking agents, neuromuscular blocking agents, adrenergic nerve inhibitors, anti-oxidants, vitamins, cosmetics, anti-inflammatories, wound care products, antithrombogenic agents, antitumoral agents, antiangiogenic agents, anesthetics, antigenic agents, wound healing agents, plant extracts, growth factors, emollients, humectants, rejection/anti-rejection drugs, spermicides, conditioners, antibacterial agents, antifungal agents, antiviral agents, antibiotics, biocidal agents, anti-biofouling agents, tranquilizers, cholesterol-reducing drugs, antitussives, histamine-blocking drugs, or monoamine oxidase inhibitors.

Other suitable pharmaceutically active agents include growth factors and cytokines. Growth factors useful in the present invention include, but are not limited to, transforming growth factor-α ("TGF-α"), transforming growth factor-β ("TGF-β"), platelet-derived growth factors including the AA, AB and BB isoforms ("PDGF"), fibroblast growth factors ("FGF"), including FGF acidic isoforms 1 and 2, FGF basic form 2, and FGF 4, 8, 9 and 10, nerve growth factors ("NGF") including NGF 2.5s, NGF 7.0s and beta NGF and neurotrophins, brain derived neurotrophic factor, cartilage derived factor, bone growth factors (BGF), basic fibroblast growth factor, insulin-like growth factor (IGF), vascular endothelial growth factor (VEGF), granulocyte colony stimulating factor (G-CSF), insulin like growth factor (IGF) I and II, hepatocyte growth factor, glial neurotrophic growth factor (GDNF), stem cell factor (SCF), keratinocyte growth factor (KGF), transforming growth factors (TGF), including TGFs alpha, beta, beta1, beta2, and beta3, skeletal growth factor, bone matrix derived growth factors, and bone derived growth factors and mixtures thereof. Cytokines useful in the present invention include, but are not limited to, cardiotrophin, stromal cell derived factor, macrophage derived chemokine (MDC), melanoma growth stimulatory activity (MGSA), macrophage inflammatory proteins 1 alpha (MIP-1 alpha), 2, 3 alpha, 3 beta, 4 and 5, IL-1, IL-2, IL-3, IL-4, IL-5, IL-6, IL-7, IL-8, IL-9, IL-10, IL-11, IL-12, IL-13, TNF-α, and TNF-β. Immunoglobulins useful in the present invention include, but are not limited to, IgG, IgA, IgM, IgD, IgE, and mixtures thereof.

Other agents that may be used to contact the polymeric fibers of the invention, include, but are not limited to, growth hormones, leptin, leukemia inhibitory factor (LIF), tumor necrosis factor alpha and beta, endostatin, angiostatin, thrombospondin, osteogenic protein-1, bone morphogenetic proteins 2 and 7, osteonectin, somatomedin-like peptide, osteocalcin, interferon alpha, interferon alpha A, interferon beta, interferon gamma, interferon 1 alpha, amino acids, peptides, polypeptides, and proteins, e.g., structural proteins, enzymes, and peptide hormones.

For agents such as nucleic acids, any nucleic acid can be used to contact the polymeric fibers. Examples include, but are not limited to deoxyribonucleic acid (DNA), ent-DNA, and ribonucleic acid (RNA). Embodiments involving DNA include, but are not limited to, cDNA sequences, natural DNA sequences from any source, and sense or anti-sense oligonucleotides. For example, DNA can be naked (e.g., U.S. Pat. Nos. 5,580,859; 5,910,488) or complexed or encapsulated (e.g., U.S. Pat. Nos. 5,908,777; 5,787,567). DNA can be present in vectors of any kind, for example in a viral or plasmid vector. In some embodiments, nucleic acids used will serve to promote or to inhibit the expression of genes in cells inside and/or outside the polymeric fibers. The nucleic acids can be in any form that is effective to enhance uptake into cells.

Agents used to treat the polymeric fibers of the invention may also be cell fragments, cell debris, organelles and other cell components, tablets, and viruses as well as vesicles, liposomes, capsules, nanoparticles, and other agents that serve as an enclosure for molecules. In some embodiments, the agents constitute vesicles, liposomes, capsules, or other enclosures that contain agents that are released at a time after contacting, such as at the time of implantation or upon later stimulation or interaction. In one illustrative embodiment, transfection agents such as liposomes contain desired nucleotide sequences to be incorporated into cells that are located in or on the polymeric fibers.

Magnetically or electrically reactive materials are examples of other agents that are optionally used to contact the polymeric fibers of the present invention. Examples of magnetically active materials include but are not limited to ferrofluids (colloidal suspensions of magnetic particles), and various dispersions of electrically conducting polymers. Ferrofluids containing particles approximately 10 nanometers in diameter, polymer-encapsulated magnetic particles about 1-2 microns in diameter, and polymers with a glass transition temperature below room temperature are particularly useful. Examples of electrically active materials are polymers including, but not limited to, electrically conducting polymers such as polyanilines and polypyrroles, ionically conducting polymers such as sulfonated polyacrylamides are related materials, and electrical conductors such as carbon black, graphite, carbon nanotubes, metal particles, and metal-coated plastic or ceramic materials.

Suitable biocides for contacting the polymeric fibers of the invention, include, but are not limited to, organotins, brominated salicylanilides, mercaptans, quaternary ammonium compounds, mercury compounds, and compounds of copper and arsenic.

Antimicrobial agents, which include antibacterial agents, antiviral agents, antifungal agents, and anti-parasitic agents, may also be used to contact the polymeric fibers of the invention.

The present invention is also directed to the polymeric fibers produced using the methods and device of the invention, as well as, tissues, membranes, filters, and drug delivery device, e.g., polymeric fibers treated with, e.g., a pharmaceutically active agent, comprising the polymeric fibers of the invention.

E. Use of Polymeric Fibers Formed Using Exemplary Embodiments

The polymeric fibers of the invention may be used in a broad range of applications, including, but not limited to, use in catalytic substrates, photonics, filtration, protective clothing, cell scaffolding, drug delivery and wound healing. Structures prepared using the polymeric fibers of the invention are good candidates for tissue engineering due to their high surface to mass ratio, high porosity for, e.g., breathability, encapsulation of active substances and fiber alignment, and because the structures can be easily wound into different shapes. Tissue engineering applications for structures made using the polymeric fibers of the invention include, but are not limited to orthopedic, muscular, vascular and neural prostheses, and regenerative medicines. Madurantakam, et al. (2009) *Nanomedicine* 4:193-206; Madurantakam, P. A., et al. (2009) *Biomaterials* 30(29): 5456-5464; Xie, et al. (2008) *Macromolecular Rapid Communications* 29:1775-1792.

Other uses of exemplary fibers include, but are not limited to, manufacture of engineered tissue and organs, including structures such as patches or plugs of tissues or matrix material, prosthetics, and other implants, tissue scaffolding for, e.g., fractal neural and/or vascular networks, repair or dressing of wounds, hemostatic devices, devices for use in tissue repair and support such as sutures, surgical and orthopedic screws, and surgical and orthopedic plates, natural coatings or components for synthetic implants, cosmetic implants and supports, repair or structural support for organs or tissues, substance delivery, bioengineering platforms, platforms for testing the effect of substances upon cells, cell culture, catalytic substrates, photonics, filtration, protective clothing, cell scaffolding, drug delivery, wound healing, food products, enzyme immobilization, use in a biosensor, forming a membrane, forming a filter, forming a fiber, forming a net, forming a food item, forming a medicinal item, forming a cosmetic item, forming a fiber structure inside a body cavity, forming a non-lethal weapon, forming packaging material (package wrapping material, spill containment, e.g., a chemical or oil spill, and the like and numerous other uses.

Mat, mesh and/or woven structures formed with exemplary fibers may be used in non-lethal weapons, for example, nets.

Biogenic polymer fibrous structures may be formed by exemplary fiber formation devices, systems and methods with different and hierarchical porosities in a single construct. The fibrous structures may, for example, be used to facilitate nutrition and vascularisation in tissues at the millimeter scale, to accommodate and mechanically support cells at the micrometer scale, and to facilitate the expression of extracellular matrix components with desired chemical and mechanical functions.

Biogenic polymer assemblies with defined dimensional scales formed by exemplary fiber formation devices, systems and methods may be used as a wound healing patch to enhance healing processes by providing essential proteins on or in the wound area to significantly shorten the healing time.

Biogenic polymers formed by exemplary fiber formation devices, systems and methods may be used as biofunctional textiles.

One of the benefits of the polymeric fibers of the invention is that they can be used to tightly control the biotic/abiotic interface. In other words, the polymeric fibers of the invention can be used to direct the growth and/or development of specific cell and/or tissue types.

For example, in one embodiment, the polymeric fibers of the invention may be used to prepare a membrane, which is useful as, for example, a dressing for wounds or injuries of any type. Stem cells, fibroblasts, epithelial cells, and/or endothelial cells may be included to allow tissue growth. In certain embodiments, use of the polymeric fibers will, in addition to providing support, will direct and/or impede desired cells types to the area of a wound or injury. For example, use of the polymeric fibers to repair the heart may include the addition of any suitable substance that will direct cells to differentiate into, for example, myocytes, rather than, for example, fibroblasts, and/or encourage the migration of a desired cell type to migrate to the area of the wound. Such methods will ensure that the repair is biologically functional and/or discourage, for example restonosis. Such use of the polymeric fibers may be combined with other methods of treatment, repair, and contouring.

In another embodiment, a polymeric fiber membrane can be inserted as a filler material into wounds to enhance healing by providing a substrate that does not have to be synthesized by fibroblasts and other cells, thereby decreasing healing time and reducing the metabolic energy requirement to synthesize new tissue at the site of the wound.

Several uses of polymeric fiber membranes are possible in the field of surgical repair or construction. For example, membranes of the present invention may be used to make tissue or orthopedic screws, plates, sutures, or sealants that are made of the same material as the tissue in which the devices will be used.

In other exemplary embodiments, polymeric fiber membranes may be used to form, e.g., a sleeve to use as reinforcement for aneurysms or at the site of an anastamosis. Such sleeves are placed over the area at which reinforcement is desired and sutured, sealed, or otherwise attached to the vessel. Polymeric fiber membranes may also be used as hemostatic patches and plugs for leaks of cerebrospinal fluid. Yet another use is as an obstruction of the punctum lacryma for a patient suffering from dry eye syndrome.

Polymeric fiber membranes may also be used to support or connect tissue or structures that have experienced injury, surgery, or deterioration. For example, such membranes may be used in a bladder neck suspension procedure for patients suffering from postpartum incontinence. Rectal support, vaginal support, hernia patches, and repair of a prolapsed uterus are other illustrative uses. The membranes may be used to repair or reinforce weakened or dysfunctional sphincter muscles, such as the esophageal sphincter in the case of esophageal reflux. Other examples include reinforcing and replacing tissue in vocal cords, epiglottis, and trachea after removal, such as in removal of cancerous tissue.

Other uses for the membranes of the invention include preparing an obstruction or reinforcement for an obstruction to a leak, for example, to seal openings in lungs after lung volume reduction (partial removal).

Another exemplary us of the polymeric fibers of the invention is as a barrier for the prevention of post-operative induced adhesion(s).

Yet another exemplary use of the polymeric fibers of the invention is to serve as a template for nerve growth.

In another embodiment of the invention, the polymeric fibers may be used to prepare a filter. Such filters are useful for filtration of contaminants, biological agents and hazardous but very small particles, e.g., nanoparticles. For example, a polymeric fiber filter of the invention may be used to purify liquids, such as water, e.g., drinking water, oil, e.g., when used in an automobile oil filter. In another embodiment, a polymeric fiber filter may be used to purify air when used in, e.g., a face mask, to filter out viruses, bacteria and hazardous nanoparticles.

The polymeric fibers of the invention may also be incorporated into biosensor devices, e.g., a device that uses a biological element (e.g., enzyme, antibody, whole cell, etc.) to monitor the presence of various chemicals on a substrate by enabling highly specific interactions between biological molecules to be detected and utilized, e.g., as a biorecognition surface. Such biosensors may be used in various applications such as the monitoring of pollutants in water, air, and soil, and in the detection of medically important molecules such as hormones, sugars, and peptides in body fluids, and for pathogen detection.

In yet other embodiments of the invention, the polymeric fibers may be used to prepare textiles. In one embodiment, the textiles are biological protective textiles, e.g., textiles that provide protection from toxic agents, e.g., biological and chemical toxins. For example, the polymeric fibers may include, e.g., chlorhexidine, which can kill most bacteria, or an oxime that can break down organophosphates, chemicals that are the basis of many pesticides, insecticides and nerve gases.

In another embodiment, the polymeric fibers may be used to prepare textiles to prepare personal protection devices and clothing, e.g., poly-paraphenylene terephthalamide helmets, gloves, and vests. Such textiles may be used as clothing for, e.g., military service personnel, police department personnel, etc.

In another embodiment, the polymeric fibers comprising poly-paraphenylene terephthalamide may be used to may be used to prepare textiles to prepare athletic wear, such as abrasion-resistant athletic wear. For example, the textiles may be used to prepare gloves used by athletes that rock climb or weight lift. Such gloves may protect the athlete's hand from abrasion and/or further injury.

In yet other embodiments, the polymeric fibers comprising poly-paraphenylene terephthalamide may be used to be used as a wound covering to prevent further injury.

In another embodiment, the textiles that contain poly-paraphenylene terephthalamide, or similar polymers to poly-paraphenylene terephthalamide may be used to make products more durable. For example, the polymeric fibers may be used in tires, shoes, bags or clothing.

In one embodiment, sheets of polymeric fibers (e.g., sheets of poly-paraphenylene terephthalamide nanofibers) are formed using the methods and devices of the invention. Such sheets prepared using the devices and methods of the present invention do not require the preparation of yarns or weaving of yarns to prepare a fabric comprising the polymeric fibers. Such sheets have the same exemplary uses as the textiles described supra.

In one embodiment, using the devices and methods of the invention, poly-paraphenylene terephthalamide nanofibers and sheets of poly-paraphenylene terephthalamide nanofibers are fabricated. As described in the appended examples, the fibers and sheets of poly-paraphenylene terephthalamide fabricated as described herein are cut- and abrasion-resistant. In contrast, fabrics prepared from poly-paraphenylene terephthalamide using methods and devices in the art are not cut-resistant unless multiple sheets of the fabric are laminated or bonded together and/or the fabrics are coated. Accordingly, the sheets and fibers of poly-paraphenylene terephthalamide of the invention are lighter than the fabrics in the art and have improved mechanical properties as compared to the fabrics in the art and may be used as, e.g., personal protection devices and clothing (e.g., bulletproof and/or bladeproof vests, gloves, helmets, etc.), athletic wear (e.g., gloves, shirts, elbow pads, knee pads, etc.), wound coverings, and as a support to increase product durability.

In embodiments of the invention using poly-paraphenylene terephthalamide, the devices and methods may be used to produce sheets of poly-paraphenylene terephthalamide nanofibers with an average spacing between fibers of about 300-1000 nm, about 350-1000 nm, about 400-1000 nm, about 450-1000 nm, about 300-950 nm, about 350-950 nm, about 400-950 nm, about 450-950 nm, about 300-900 nm, about 350-900 nm, about 400-900 nm, about 450-900 nm, about 300-850 nm, about 350-850 nm, about 400-850 nm, about 450-850 nm, about 300-800 nm, about 350-800 nm, about 400-800 nm, about 450-800 nm, about 500-750 nm, or an average spacing of about, e.g., 300, 350, 400, 450, 500, 550, 600, 650, 700, 750, 800, 850, 900, 950, or about 1000 nm. Ranges and values intermediate to the above recited ranges and values are also contemplated to be part of the invention.

In some embodiments of the invention using poly-paraphenylene terephthalamide, the devices and methods may be used to produce sheets of poly-paraphenylene terephthalamide comprising nanofibers having an average diameter of about 0.5-5.0 μm, about 1.0-5.0 μm, about 1.5-5.0 μm, about 2.0-5.0 μm, about 0.5-4.5 μm, about 1.0-4.5 μm, about 1.5-4.5 μm, about 2.0-4.5 μm, about 0.5-4.0 μm, about 1.0-4.0 μm, about 1.5-4.0 μm, about 2.0-4.0 μm, or an average diameter of about 0.5, 0.55, 1, 1.5, 2, 2.5, 3, 3.5, 4, 4.5, or about 5 μm. Ranges and values intermediate to the above recited ranges and values are also contemplated to be part of the invention.

In some embodiments of the invention using poly-paraphenylene terephthalamide, the devices and methods may be used to produce sheets of poly-paraphenylene terephthalamide comprising nanofibers having an average thickness of about 0.1 to about 10 cm. Ranges and values intermediate to the above recited ranges and values are also contemplated to be part of the invention.

In another embodiment, the polymeric fibers of the invention may be used to prepare food products. For example, polymeric fibers may be made of an edible polymer, e.g., alginate, to which a flavoring, e.g., fruit flavoring or chocolate, may be added. In one embodiment, the food product is not cotton candy.

In another embodiment, the polymeric fibers of the invention may be used to prepare furniture upholstery.

In another embodiment, the polymeric fibers of the invention may be used to form or manufacture medical devices.

Another use of the polymeric fibers of the present invention is the delivery of one or more substances to a desired location and/or in a controlled manner. In some embodiments, the polymeric fibers are used to deliver the materials, e.g., a pharmaceutically active substance. In other embodiments, the polymeric fibers materials are used to deliver substances that are contained in the polymeric fibers or that are produced or released by substances contained in the polymeric fibers materials. For example, polymeric fibers containing cells can be implanted in a body and used to deliver molecules produced by the cells after implantation. The present compositions can be used to deliver substances to an in vivo location, an in vitro location, or other locations. The present compositions can be applied or administered to these locations using any method.

The ability to seed the polymeric fibers of the invention with living cells also provides the ability to build tissue, organs, or organ-like tissues. Cells included in such tissues or organs can include cells that serve a function of delivering a substance, seeded cells that will provide the beginnings of replacement tissue, or both.

In one embodiment of the invention, a plurality of polymeric fibers are treated with a plurality of living cells and cultured under appropriate conditions to produce a bioengineered tissue.

In some embodiments, polymeric fibers contacted or seeded with living cells are combined with a drug such that the function of the implant will improve. For example, antibiotics, anti-inflammatories, local anesthetics or combinations thereof, can be added to the cell-treated polymeric fibers of a bioengineered organ to speed the healing process.

Examples of bioengineered tissue include, but are not limited to, bone, dental structures, joints, cartilage, (including, but not limited to articular cartilage), skeletal muscle, smooth muscle, cardiac muscle, tendons, menisci, ligaments, blood vessels, stents, heart valves, corneas, ear drums, nerve guides, tissue or organ patches or sealants, a filler for missing tissues, sheets for cosmetic repairs, skin (sheets with cells added to make a skin equivalent), soft tissue structures of the throat such as trachea, epiglottis, and vocal cords, other cartilaginous structures such as articular cartilage, nasal cartilage, tarsal plates, tracheal rings, thyroid cartilage, and arytenoid cartilage, connective tissue, vascular grafts and components thereof, and sheets for topical applications, and repair of organs such as livers, kidneys, lungs, intestines, pancreas visual system, auditory system, nervous system, and musculoskeletal system.

In one particular embodiment, a plurality of polymeric fibers are contacted with a plurality of living muscle cells and cultured under appropriate conditions to guide cell growth with desired anisotropy to produce a muscle thin film (MTF) or a plurality of MTFs prepared as described in U.S. Patent Publication Nos. 20090317852 and 20120142556, and PCT Application No. PCT/US2012/068787. The entire contents of each of the foregoing are incorporated herein by reference.

Polymeric fibers contacted with living cells can also be used to produce prosthetic organs or parts of organs. Mixing of committed cell lines in a three dimensional polymeric fiber matrix can be used to produce structures that mimic complex organs. The ability to shape the polymeric fibers allows for preparation of complex structures to replace organs such as liver lobes, pancreas, other endocrine glands, and kidneys. In such cases, cells are implanted to assume the function of the cells in the organs. Preferably, autologous cells or stem cells are used to minimize the possibility of immune rejection.

In some embodiments, polymeric fibers contacted with living cells are used to prepare partial replacements or augmentations. For example, in certain disease states, organs are scarred to the point of being dysfunctional. A classic example is hepatic cirrhosis. In cirrhosis, normal hepatocytes are trapped in fibrous bands of scar tissue. In one embodiment of the invention, the liver is biopsied, viable liver cells are obtained, cultured in a plurality of polymeric fibers, and re-implanted in the patient as a bridge to or replacement for routine liver transplantations.

In another example, by growing glucagon secreting cells, insulin secreting cells, somatostatin secreting cells, and/or pancreatic polypeptide secreting cells, or combinations thereof, in separate cultures, and then mixing them together with polymeric fibers, an artificial pancreatic islet is created. These structures are then placed under the skin, retroperitoneally, intrahepatically or in other desirable locations, as implantable, long-term treatments for diabetes.

In other examples, hormone-producing cells are used, for example, to replace anterior pituitary cells to affect synthesis and secretion of growth hormone secretion, luteinizing hormone, follicle stimulating hormone, prolactin and thyroid stimulating hormone, among others. Gonadal cells, such as Leydig cells and follicular cells are employed to supplement testosterone or estrogen levels. Specially designed combinations are useful in hormone replacement therapy in post and perimenopausal women, or in men following decline in endogenous testosterone secretion. Dopamine-producing neurons are used and implanted in a matrix to supplement defective or damaged dopamine cells in the substantia nigra. In some embodiments, stem cells from the recipient or a donor can be mixed with slightly damaged cells, for example pancreatic islet cells, or hepatocytes, and placed in a plurality of polymeric fibers and later harvested to control the differentiation of the stem cells into a desired cell type. In other embodiments thyroid cells can be seeded and grown to form small thyroid hormone secreting structures. This procedure is performed in vitro or in vivo. The newly formed differentiated cells are introduced into the patient.

Bioengineered tissues are also useful for measuring tissue activities or functions, investigating tissue developmental biology and disease pathology, as well as in drug discovery and toxicity testing.

Accordingly, the present invention also provides methods for identifying a compound that modulates a tissue function. The methods include providing a bioengineered tissue produced according to the methods of the invention, such as a muscle thin film; contacting the bioengineered tissue with a test compound; and determining the effect of the test compound on a tissue function in the presence and absence of the test compound, wherein a modulation of the tissue function in the presence of the test compound as compared to the tissue function in the absence of the test compound indicates that the test compound modulates a tissue function, thereby identifying a compound that modulates a tissue function.

In another aspect, the present invention also provides methods for identifying a compound useful for treating or preventing a disease. The methods include providing a bioengineered tissue produced according to the methods of the invention, e.g., a muscle thin film; contacting a bioengineered tissue with a test compound; and determining the effect of the test compound on a tissue function in the presence and absence of the test compound, wherein a modulation of the tissue function in the presence of the test compound as compared to the tissue function in the absence of the test compound indicates that the test compound modulates a tissue function, thereby identifying a compound useful for treating or preventing a disease.

The methods of the invention generally comprise determining the effect of a test compound on a bioengineered tissue as a whole, however, the methods of the invention may comprise further evaluating the effect of a test compound on an individual cell type(s) of the bioengineered tissue.

The methods of the invention may involve contacting a single bioengineered tissue with a test compound or a plurality of bioengineered tissues with a test compound.

As used herein, the various forms of the term "modulate" are intended to include stimulation (e.g., increasing or upregulating a particular response or activity) and inhibition (e.g., decreasing or downregulating a particular response or activity).

As used herein, the term "contacting" (e.g., contacting a bioengineered tissue with a test compound) is intended to include any form of interaction (e.g., direct or indirect interaction) of a test compound and a bioengineered tissue. The term contacting includes incubating a compound and a bioengineered tissue (e.g., adding the test compound to a bioengineered tissue).

Test compounds, may be any agents including chemical agents (such as toxins), small molecules, pharmaceuticals, peptides, proteins (such as antibodies, cytokines, enzymes, and the like), and nucleic acids, including gene medicines and introduced genes, which may encode therapeutic agents, such as proteins, antisense agents (i.e., nucleic acids comprising a sequence complementary to a target RNA expressed in a target cell type, such as RNAi or siRNA), ribozymes, and the like.

The test compound may be added to a bioengineered tissue by any suitable means. For example, the test compound may be added drop-wise onto the surface of a bioengineered tissue of the invention and allowed to diffuse into or otherwise enter the bioengineered tissue, or it can be added to the nutrient medium and allowed to diffuse through the medium. In the embodiment where the bioengineered tissue is cultured in a multi-well plate, each of the culture wells may be contacted with a different test compound or the same test compound. In one embodiment, the screening platform includes a microfluidics handling system to deliver a test compound and simulate exposure of the microvasculature to drug delivery.

Numerous physiologically relevant parameters, e.g., insulin secretion, conductivity, neurotransmitter release, lipid production, bile secretion, e.g., muscle activities, e.g., biomechanical and electrophysiological activities, can be evaluated using the polymeric fiber tissues of the invention. For example, in one embodiment, the polymeric fiber tissues of the present invention can be used in contractility assays for muscular cells or tissues, such as chemically and/or electrically stimulated contraction of vascular, airway or gut smooth muscle, cardiac muscle or skeletal muscle. In addition, the differential contractility of different muscle cell types to the same stimulus (e.g., pharmacological and/or electrical) can be studied.

In another embodiment, the bioengineered tissues of the present invention can be used for measurements of solid stress due to osmotic swelling of cells. For example, as the cells swell the polymeric fiber tissues will bend and as a result, volume changes, force and points of rupture due to cell swelling can be measured.

In another embodiment, the bioengineered tissues of the present invention can be used for pre-stress or residual stress measurements in cells. For example, vascular smooth muscle cell remodeling due to long term contraction in the presence of endothelin-1 can be studied.

Further still, the bioengineered tissues of the present invention can be used to study the loss of rigidity in tissue structure after traumatic injury, e.g., traumatic brain injury.

Traumatic stress can be applied to vascular smooth muscle bioengineered tissues as a model of vasospasm. These bioengineered tissues can be used to determine what forces are necessary to cause vascular smooth muscle to enter a hyper-contracted state. These bioengineered tissues can also be used to test drugs suitable for minimizing vasospasm response or improving post-injury response and returning vascular smooth muscle contractility to normal levels more rapidly.

In other embodiments, the bioengineered tissues of the present invention can be used to study biomechanical responses to paracrine released factors (e.g., vascular smooth muscle dilation due to release of nitric oxide from vascular endothelial cells, or cardiac myocyte dilation due to release of nitric oxide).

In other embodiments, the bioengineered tissues of the invention can be used to evaluate the effects of a test compound on an electrophysiological parameter, e.g., an electrophysiological profile comprising a voltage parameter selected from the group consisting of action potential, action potential duration (APD), conduction velocity (CV), refractory period, wavelength, restitution, bradycardia, tachycardia, reentrant arrhythmia, and/or a calcium flux parameter, e.g., intracellular calcium transient, transient amplitude, rise time (contraction), decay time (relaxation), total area under the transient (force), restitution, focal and spontaneous calcium release. For example, a decrease in a voltage or calcium flux parameter of a bioengineered tissue comprising cardiomyocytes upon contacting the bioengineered tissue with a test compound, would be an indication that the test compound is cardiotoxic.

In yet another embodiment, the bioengineered tissues of the present invention can be used in pharmacological assays for measuring the effect of a test compound on the stress state of a tissue. For example, the assays may involve determining the effect of a drug on tissue stress and structural remodeling of the bioengineered tissues. In addition, the assays may involve determining the effect of a drug on cytoskeletal structure and, thus, the contractility of the bioengineered tissues.

In still other embodiments, the bioengineered tissues of the present invention can be used to measure the influence of biomaterials on a biomechanical response. For example, differential contraction of vascular smooth muscle remodeling due to variation in material properties (e.g., stiffness, surface topography, surface chemistry or geometric patterning) of bioengineered tissues can be studied.

In further embodiments, the bioengineered tissues of the present invention can be used to study functional differentiation of stem cells (e.g., pluripotent stem cells, multipotent stem cells, induced pluripotent stem cells, and progenitor cells of embryonic, fetal, neonatal, juvenile and adult origin) into contractile phenotypes. For example, the polymeric fibers of the invention are treated with undifferentiated cells, e.g., stem cells, and differentiation into a contractile phenotype is observed by thin film bending. Differentiation can be observed as a function of: co-culture (e.g., co-culture with differentiated cells), paracrine signaling, pharmacology, electrical stimulation, magnetic stimulation, thermal fluctuation, transfection with specific genes and biomechanical perturbation (e.g., cyclic and/or static strains)

In another embodiment, the bioengineered tissues of the invention may be used to determine the toxicity of a test compound by evaluating, e.g., the effect of the compound on an electrophysiological response of a bioengineered tissue. For example, opening of calcium channels results in influx of calcium ions into the cell, which plays an important role in excitation-contraction coupling in cardiac and skeletal muscle fibers. The reversal potential for calcium is positive, so calcium current is almost always inward, resulting in an action potential plateau in many excitable cells. These channels are the target of therapeutic intervention, e.g., calcium channel blocker sub-type of anti-hypertensive drugs. Candidate drugs may be tested in the electrophysiological characterization assays described herein to identify those compounds that may potentially cause adverse clinical effects, e.g., unacceptable changes in cardiac excitation, that may lead to arrhythmia.

For example, unacceptable changes in cardiac excitation that may lead to arrhythmia include, e.g., blockage of ion channel requisite for normal action potential conduction, e.g., a drug that blocks $Na^+$ channel would block the action potential and no upstroke would be visible; a drug that blocks $Ca^{2+}$ channels would prolong repolarization and increase the refractory period; blockage of $K^+$ channels would block rapid repolarization, and, thus, would be dominated by slower $Ca^{2+}$ channel mediated repolarization.

In addition, metabolic changes may be assessed to determine whether a test compound is toxic by determining, e.g., whether contacting a bioengineered tissue with a test compound results in a decrease in metabolic activity and/or cell death. For example, detection of metabolic changes may be measured using a variety of detectable label systems such as fluormetric/chrmogenic detection or detection of bioluminescence using, e.g., AlamarBlue fluorescent/chromogenic determination of REDOX activity (Invitrogen), REDOX indicator changes from oxidized (non-fluorescent, blue) state to reduced state (fluorescent, red) in metabolically active cells; Vybrant MTT chromogenic determination of metabolic activity (Invitrogen), water soluble MTT reduced to insoluble formazan in metabolically active cells; and Cyquant NF fluorescent measurement of cellular DNA content (Invitrogen), fluorescent DNA dye enters cell with assistance from permeation agent and binds nuclear chromatin. For bioluminescent assays, the following exemplary reagents are used: Cell-Titer Glo luciferase-based ATP measurement (Promega), a thermally stable firefly luciferase glows in the presence of soluble ATP released from metabolically active cells.

The bioengineered tissues of the invention are also useful for evaluating the effects of particular delivery vehicles for therapeutic agents e.g., to compare the effects of the same agent administered via different delivery systems, or simply to assess whether a delivery vehicle itself (e.g., a viral vector or a liposome) is capable of affecting the biological activity of the bioengineered tissue. These delivery vehicles may be of any form, from conventional pharmaceutical formulations, to gene delivery vehicles. For example, the devices of the invention may be used to compare the therapeutic effect of the same agent administered by two or more different delivery systems (e.g., a depot formulation and a controlled release formulation). The bioengineered tissues of the invention may also be used to investigate whether a particular vehicle may have effects of itself on the tissue. As the use of gene-based therapeutics increases, the safety issues associated with the various possible delivery systems become increasingly important. Thus, the bioengineered tissues of the present invention may be used to investigate the properties of delivery systems for nucleic acid therapeutics, such as naked DNA or RNA, viral vectors (e.g., retroviral or adenoviral vectors), liposomes and the like. Thus, the test compound may be a delivery vehicle of any appropriate type with or without any associated therapeutic agent.

Furthermore, the bioengineered tissues of the present invention are a suitable in vitro model for evaluation of test compounds for therapeutic activity with respect to, e.g., a muscular and/or neuromuscular disease or disorder. For example, the bioengineered tissues of the present invention (e.g., comprising muscle cells) may be contacted with a candidate compound by, e.g., immersion in a bath of media containing the test compound, and the effect of the test compound on a tissue activity (e.g., a biomechanical and/or electrophysiological activity) may be measured as described herein, as compared to an appropriate control, e.g., an untreated bioengineered tissue. Alternatively, a bioengineered tissue of the invention may be bathed in a medium containing a candidate compound, and then the cells are washed, prior to measuring a tissue activity (e.g., a biomechanical and/or electrophysiological activity) as described herein. Any alteration to an activity determined using the bioengineered tissue in the presence of the test agent (as compared to the same activity using the device in the absence of the test compound) is an indication that the test compound may be useful for treating or preventing a tissue disease, e.g., a neuromuscular disease.

Additional contemplated uses of the polymeric fibers of the invention are disclosed in, for example, PCT Publication Nos.: WO 2008/045506, WO 2003/099230, and WO 2004/032713, the entire contents of which are incorporated herein by reference.

This invention is further illustrated by the following examples which should not be construed as limiting. The contents of all references, patents and published patent applications cited throughout this application, as well as the Figures, are hereby incorporated herein in their entirety by reference.

EXAMPLES

Figure 5:
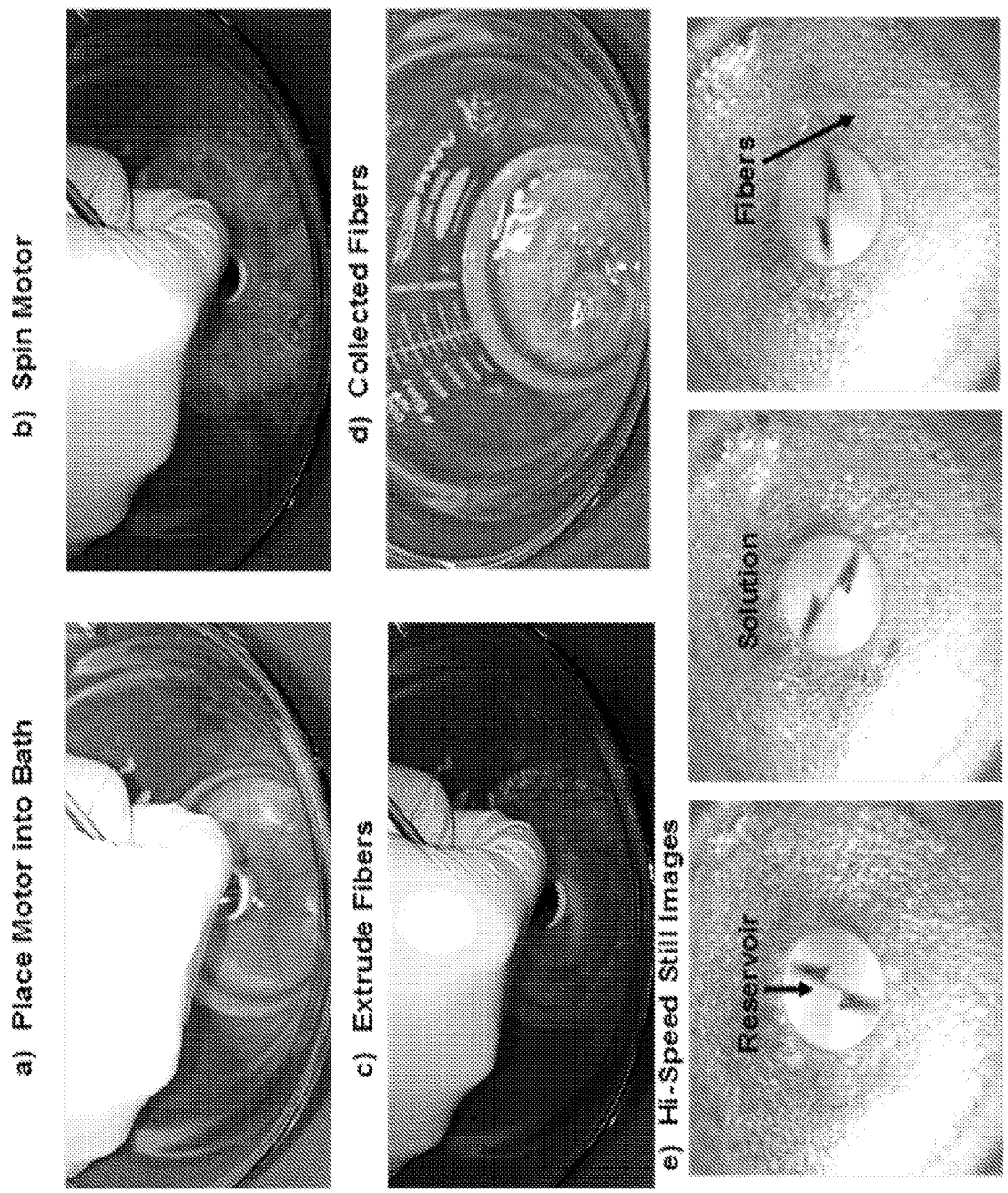
FIGS. 5A-5E illustrate an exemplary method for the fabrication of polymeric fibers from a solution of deoxyribonucleic acid (DNA). A solution of 5% DNA dissolved in a 7:3 mixture of water:ethanol, was rotated at 16,000 rpm into a 95% ethanol solution within the collection device.

Example 1. Immersion Rotary Jet Spinning Devices (iRJS) and Methods of Use for the Fabrication of Polymeric Fibers Although devices and methods for the production of polymeric fibers employing rotational motion have been previously described (see, e.g., U.S. Patent Publication No U.S. 2012/0135448 and PCT Publication No. WO2012/068402), fabrication of polymeric fibers using polymers which are water soluble, and/or those that require on-contact crosslinking and/or precipitation to form physically and chemically stable polymeric fibers remains challenging. The present invention provides a solution to this problem by providing devices, referred to herein as immersion Rotary Jet Spinning (iRJS), and methods of use of such devices to fabricate polymeric fibers, e.g., nanofibers, e.g., isotropically or anisotropically aligned nanofibers (see, e.g., FIG. 5). An exemplary iRJS device is shown in FIG. 1.

The devices of the invention include a collection bath containing a liquid which can be used to crosslink polymers or proteins or precipitate solid fibers out of solution when shear forces are applied to a polymer solution as it is forced through an orifice of a rotating reservoir into the liquid. In other words, shear forces act to elongate the polymer and reduce the diameter of the polymeric fibers while the liquid aids in solidification.

Two non-limiting examples of polymers suitable for use in the devices and methods of the present invention are deoxyribonucleic acid (DNA) and alginate.

For example, a solvent for DNA, water, binds strongly to the backbone of the DNA molecule. To facilitate solidification and removal of water from the polymer jet during spinning, ethanol is placed in the collection device and is used to precipitate the DNA out of the solution.

In another example, alginate (alginic acid) is dissolved in water and requires a crosslinking agent to form solid materials with long-term stability. Calcium chloride solutions can be used to crosslink alginate into gels and fibers, but requires a two-step process to achieve. In contrast, the fabrication of alginate polymeric fibers using an iRJS device is a one-step process; iRJS allows for the alginate solution to be spun into a bath of calcium chloride and form solid and insoluble nanofibers during spinning, thereby forming fibers in a one-step process.

Polymer solutions that require on-contact crosslinking and/or precipitation have been used to fabricate polymeric fibers having nanometer dimensions using the iRJS devices and methods of the present invention. Exemplary DNA and alginate polymeric nanofibers fibers are shown in FIGS. 6 and 7.

Nanofibers produced by this method may promote migratory cell adhesion for applications such as wound dressings, clothing, substrates for cell seeding, and coating of implantable devices.

In particular, this technique may be used to fabricate water insoluble, three-dimensional relevant biological scaffolds composed of alginate or DNA nanofibers designed to mimic the extracellular matrix (ECM). The ECM is composed of 3D array fibers on the nanoscale assisting in cellular adhesion (Goodman et al. *Biomaterials* 1996). The production of nanofibers as described above may tailor the nanofiber properties to mimic the biological microenvironment of the tissue under study. After fabrication by spinning into solution, cells may be seeded to create an assay for the testing the effects of compounds (i.e., pharmaceutical drugs) on the tissue in question.

Example 2. Immersion Rotary Jet Spinning of Cut-Resistant Poly-Paraphenylene Terephthalamide Polymeric Fibers Poly-paraphenylene terephthalamide polymer was dissolved in sulfuric acid at a concentration of 10% weight/volume at 70° C. After solvation, the polymer solution was fed into the reservoir of an iRJS device as described herein. The iRJS device included a reservoir having a 12.5 mm diameter and a 25.4 mm height, and two orifices, each having a diameter of 340 micrometers, and an orifice length of 4.15 mm. The collection device included a cylinder holding 1.5 L of water, a 11.0 cm stir bar and a motion generator to rotate the stir bar at about 350 rpm. The distance between the orifice and the liquid in the collection device before operation was 3.5 cm and the distance between the liquid vortex and the orifice during operation was also 3.5 cm.

The reservoir was rotated at 60,000 rpm for 2 minutes, fibers were ejected into the liquid vortex generated by rotating the liquid in the collection device to form a sheet of solid and insoluble nanofibers in a one-step process. The sheets were removed from the collection device using a rotating drum having a 5.0 cm diameter and a 5.0 cm height. The drum was attached to a stir bar and a stabilizing bar. The size of the sheet fabricated was 20.0 cm in length, 2.0 cm in width, and 0.25 cm in thickness (see FIGS. 10A-10E).

In one experiment, a single sheet of poly-paraphenylene terephthalamide nanofibers comprising fibers having a diameter of about 2.0 μm, and about 0.5 cm in width, 2 cm in length and 0.2 cm in thickness with an approximate spacing between fibers of about 500 to about 750 nm was produced and used for a puncture test. Briefly, about 50 Newtons of force was applied to a blade that was approximately 0.23 mm thick to determine whether the sheets could be punctured. Surprisingly, when a razor blade was forced into the nanofiber sheet, the blade did not puncture the polymer sheet. The same test was performed using a sheet of poly-paraphenylene terephthalamide microfibers (e.g. Kevlar; National Stock Number (NSN): 8470-01-465-1763;

Contract #: DAANO2-98-D-5006) that was 0.2 cm thick and, in this case, the fibers were cut by the blade (see FIGS. 11A-11D).

While not wishing to be bound by theory, it is believed that the devices and methods of the claimed invention eject the liquid polymer into the air vortex resulting in extension of the ejected jets of polymer prior to encountering water in the collection device where they then form a liquid crystal permitting molecular interaction between individual fibers to thereby form a dense sheet of nanofibers. Using this one step process for forming sheets of poly-paraphenylene terephthalamide nanofibers, the distance between individual fibers is reduced (as compared to a fabric of poly-paraphenylene terephthalamide nanofibers, e.g., Kevlar; see FIGS. 11E and 11F), to thereby prepare a sheet of fibers that is thinner than other fabrics prepared using poly-paraphenylene terephthalamide, and yet is still cut resistant.

The cut-resistance of the poly-paraphenylene terephthalamide nanofiber sheets are also assessed using the ASTM F1790 (the standard for the U.S.), ISO 13997 (the international standard) and EN 388 (the European Standard) test methods.

The ASTM F1790 and the ISO 13997 test methods use the CPP and TDM test method which consists of a straight blade that is slid along the length of a sample with three different weights. The sample is cut five times and the data is used to determine the required load needed to cut through a sample at a reference distance of 20 mm (0.8"). The EN 388 test method uses the Couptest which consists of a circular blade with a fixed load that is moved back and forth across the fabric to determine how long it takes to cut through. Again, 5 cuts are used to determine the cut index.

The abrasion resistance and puncture resistance of the sheets are also determined using standard methods known in the art, such as the ASTM D4157-13 method to test abrasion resistance and the ASTM F1342 method to test puncture resistance.

EQUIVALENTS

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements or method steps, those elements or steps may be replaced with a single element or step. Likewise, a single element or step may be replaced with a plurality of elements or steps that serve the same purpose. Further, where parameters for various properties are specified herein for exemplary embodiments, those parameters may be adjusted up or down by 1/20th, 1/10th, 1/5th, 1/3rd, 1/2, etc., or by rounded-off approximations thereof, unless otherwise specified. Moreover, while exemplary embodiments have been shown and described with references to particular embodiments thereof, those of ordinary skill in the art will understand that various substitutions and alterations in form and details may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than shown.

INCORPORATION BY REFERENCE

The contents of all references, including patents and patent applications, cited throughout this application are hereby incorporated herein by reference in their entirety. The appropriate components and methods of those references may be selected for the invention and embodiments thereof. Still further, the components and methods identified in the Background section are integral to this disclosure and can be used in conjunction with or substituted for components and methods described elsewhere in the disclosure within the scope of the invention.

We claim:

1. A device for formation of one or more micron, submicron or nanometer dimension polymeric fibers, the device comprising:
    a reservoir for holding a polymer and including a lateral surface having one or more orifices for ejecting the polymer for fiber formation;
    a motion generator configured to impart rotational motion about an axis of rotation to the reservoir, the rotational motion of the reservoir causing ejection of the polymer radially outward with respect to the axis of rotation from the one or more orifices; and
    a collection device configured to hold a liquid, and the collection device configured and positioned to accept the polymer ejected from the reservoir;
    wherein the reservoir and the collection device are positioned and configured such that the one or more orifices of the reservoir are submerged in a liquid held in the collection device during rotational motion of the reservoir; and
    wherein the device is configured such that the ejection of the polymer into the liquid in the collection device causes formation of one or more micron, submicron or nanometer dimension polymeric fibers.

2. The device of claim 1, wherein at least one of the one or more orifices has any asymmetric cross-sectional shape.

3. The device of claim 1, wherein at least one of the one or more orifices has a cross-sectional shape selected from the group consisting of a star, a rectangle, and a cross.

4. The device of claim 1, further comprising a first nozzle provided on a first of the one or more orifices, wherein a cross-sectional shape of an outlet of the first nozzle is different than a cross-sectional shape of the first orifice.

5. The device of claim 4, wherein the cross-sectional shape of the outlet of the first nozzle is configured to create one or more structural features on a surface of the formed polymeric fibers.

6. The device of claim 5, wherein the one or more structural features have a size in a range from about 1 nanometer to about 500 nanometers.

7. The device of claim 1, wherein the motion generator is configured to impart rotational motion about an axis of rotation to the reservoir within a range of 50,000 rotations per minute (rpm) to 100,000 rpm.

8. A method for fabricating one or more micron, submicron or nanometer dimension polymeric fibers, the method comprising:
    providing the device of claim 1;
    using the motion generator to rotate the reservoir about an axis of rotation to cause ejection of the polymer in one or more jets; and collecting the one or more jets of the polymer in the liquid held in the collection device to cause formation of the one or more micron, submicron or nanometer dimension polymeric fibers.

9. The method of claim 8, wherein during ejection of the polymer in one or more the one or more orifices are partially submerged in the liquid in the collection device.

10. The method of any one of claim 8, wherein the polymer is selected from the group consisting of a water soluble polymer, a polymer that requires on-contact cross-linking, a polymer that cannot be readily dissolved at a high enough concentrations to provide sufficient viscosity for random entanglement and solvent evaporation to form polymeric fibers, a polymer that requires precipitation, and a polymer dissolved in water at low concentrations.

11. The method of any one of claim 8, wherein the liquid is water, calcium chloride, sulfuric acid, or 30% ethanol.

12. The method of any one of claim 8, wherein the reservoir is rotated at about 1,000 rpm to about 90,000 rpm.

13. The method of any one of claim 8, wherein the one or more orifices have a cross-sectional diameter of about 1 micron to about 100 millimeters, or the one or more orifices have a length of about 10 microns to about 100 centimeters.

\* \* \* \* \*